United States Patent
Buffone

(10) Patent No.: US 10,986,202 B2
(45) Date of Patent: Apr. 20, 2021

(54) SYSTEMS AND METHODS FOR MANAGING LOADING OF SERVICES FROM AT LEAST ONE SERVER

(71) Applicant: Yottaa, Inc., Waltham, MA (US)

(72) Inventor: Robert Buffone, Wakefield, MA (US)

(73) Assignee: Yottaa, Inc., Waltham, MA (US)

( * ) Notice: Subject to any disclaimer, the term of this patent is extended or adjusted under 35 U.S.C. 154(b) by 0 days.

(21) Appl. No.: 16/389,594

(22) Filed: Apr. 19, 2019

(65) Prior Publication Data

US 2019/0327324 A1 Oct. 24, 2019

Related U.S. Application Data

(60) Provisional application No. 62/661,258, filed on Apr. 23, 2018.

(51) Int. Cl.
*H04L 29/08* (2006.01)
*H04L 29/06* (2006.01)

(52) U.S. Cl.
CPC .......... *H04L 67/2819* (2013.01); *H04L 67/42* (2013.01)

(58) Field of Classification Search
CPC ........ G06F 11/30; G06F 11/34; G06F 11/302; G06F 13/00; G06F 16/955; G06F 16/9574; H04L 29/06; H04L 29/08; H04L 29/08072; H04L 41/12; H04L 41/22; H04L 41/0213; H04L 67/02; H04L 67/34; H04L 67/303; H04L 67/2842; H04L 69/40; H04L 67/42; H04L 67/47; H04L 67/2819

USPC ......................................................... 709/223
See application file for complete search history.

(56) References Cited

U.S. PATENT DOCUMENTS

| | | | |
|---|---|---|---|
| 8,762,583 B1* | 6/2014 | Faibish | G06F 3/0605 706/20 |
| 2003/0036886 A1 | 2/2003 | Stone | |
| 2009/0193126 A1 | 7/2009 | Agarwal et al. | |
| 2011/0276695 A1* | 11/2011 | Maldaner | H04L 41/00 709/226 |
| 2013/0326044 A1* | 12/2013 | Maldaner | H04L 41/00 709/223 |
| 2016/0315830 A1* | 10/2016 | Cote | H04L 47/127 |

(Continued)

OTHER PUBLICATIONS

International Search Report and Written Opinion for PCT Appl. No. PCT/US2019/028576 dated Oct. 8, 2019.

*Primary Examiner* — Robert B Harrell
(74) *Attorney, Agent, or Firm* — Foley & Lardner LLP

(57) ABSTRACT

This disclosure is directed to methods and systems for managing client-side services. An intermediary may receive from an agent incorporated into a web application or client-side application and executing on the client device, a request for a configuration to manage loading of services from the at least one server onto the web application or client-side application. The intermediary can determine an expected temporal pattern of use for at least some of the services at the client device. The intermediary can generate the configuration. The configuration can specify for each of the services, an expected amount of bandwidth to be utilized for loading the corresponding service from the at least one server onto the web application or client-side application, and a loading priority according to the expected temporal pattern of use. The intermediary can send the configuration to the agent.

20 Claims, 16 Drawing Sheets

(56) References Cited

U.S. PATENT DOCUMENTS

| | | |
|---|---|---|
| 2017/0116059 A1 | 4/2017 | Wolf et al. |
| 2019/0052532 A1* | 2/2019 | Chen .................. H04L 41/0893 |

* cited by examiner

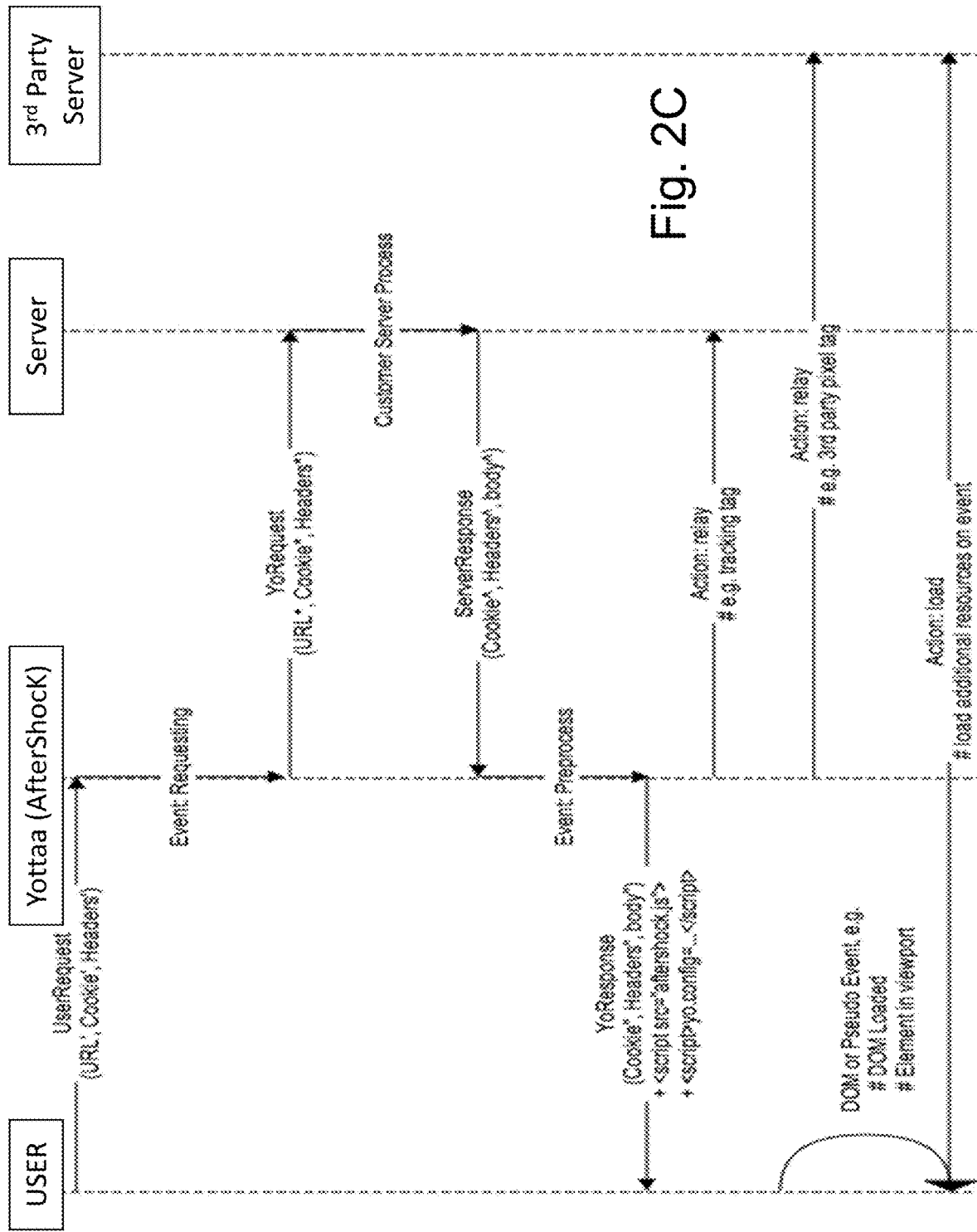

SYSTEMS AND METHODS FOR MANAGING LOADING OF SERVICES FROM AT LEAST ONE SERVER

RELATED APPLICATIONS

This application claims priority to U.S. provisional application 62/661,258, filed Apr. 23, 2018, entitled "REQUEST ORCHESTRATION USING PREDICTIVE SERVICE CONGESTION CONTROL", which is hereby incorporated by reference in its entirety for all purposes.

FIELD OF THE DISCLOSURE

This disclosure generally relates to systems and methods for web performance optimization, including but not limited to systems and methods for managing services.

BACKGROUND OF THE DISCLOSURE

Many services can be integrated into applications, such as client applications or web applications. These services, sometimes referred to as third-party and/or client-side services, can be in the form of pixels, tags, beacons, plugins, agents, widgets, etc.

BRIEF SUMMARY OF THE DISCLOSURE

Described herein are systems and methods for governing client-side services. These services can utilize one or more mechanisms to bootstrap their functionality to a web/client application, including but not limited to: HTML standards, JavaScript invocation, tag managers, for instance. Once bootstrapped, a service can be completely left up to its own code to handle the loading of further resources and/or modification of the web/client application. Because the service's code operates outside of the control of the web/client application's server, there is no ability to control such a third party service once its code is loaded into the web/client application. This can present a serious gap in monitoring and/or controlling operations of the service, e.g., when an anomaly or delay arises from the operation of the service. For instance, there can be challenges in managing service level agreements (SLAs), ensuring compliance to standards, addressing detected changes as well as detrimental effects on the performance of a corresponding web/client application.

Embodiments of the systems and methods described herein can be used to govern or manage client-side services, and can address or overcome challenges of integrating client-side services into client/web applications. The present systems and method can incorporate the use of an intermediary between one or more client devices and at least one server of the client/web application, which collects metadata from the one or more client devices, and detects for anomalies in the operations of one or more services, according to the metadata. The intermediary can control an operation of a particular service, according to a detected anomaly, by for instance delaying, removing or modifying an operation of the service associated with the detected anomaly.

In one aspect, this disclosure is directed to a method for managing client-side services. An intermediary may receive metadata from a first client device of the plurality of client devices. The metadata can include runtime characteristics of a first instance of a service that is incorporated into a client-side application or a web application. The first instance may execute on the first client device and request service data from the at least one server. The intermediary can detect an anomaly in the operation of the first instance of the service. The intermediary can identify an operation of the first instance of the service causing the detected anomaly. The intermediary can, responsive to the detected anomaly, cause delay, removal or modification of operations corresponding to the identified operation, in other instances of the service executing on the plurality of client devices.

In certain embodiments, the runtime characteristics of the first instance of the service includes at least one of: a count of requests made by the first instance for the service data, a uniform request locator (URL) referenced in a request by the first instance, a start time of the request, a duration for responding to the request, a priority of the request, or an invocation path of the request. The runtime characteristics of the first instance of the service can include a script execution error, a failure in a request for the service data, or an error in hypertext markup language (HTML), detected by an agent executing on the client device.

In some embodiments, the intermediary can detect the anomaly in the operation of the first instance of the service, by comparing the detected runtime characteristics with historical data from instances of the service maintained in a storage device. The intermediary can maintain the received runtime characteristics of the first instance in a storage device. The intermediary can identify the service or categorize the service as a new service, responsive to comparing the received runtime characteristics of the first instance to a repository of information about services. The anomaly can include a delay in receiving service data requested from the at least one server, a script execution error, an unexpected modification or disparity in a user interface of the first instance, a disparity in size or content of the requested service data, a disparity in content of a request to the at least one server, or a statistical difference between the runtime characteristics and historical data.

In some embodiments, the intermediary can determine an operation of the service causing the detected anomaly. The determined operation can include invocation or initiation of the first instance, request to the server for the service data, configuration of the first instance, modification of a user interface of the first instance, or collection of analytics via the first instance. The intermediary can identify a context of the service affected by the detected anomaly. The context can include at least one of: a geographical domain of the client device, a type of the client device, a type or version of the client-side application used with the service, or a page of the web application using the service. The intermediary can delay, remove or modify the operations corresponding to the identified operation, in other instances of the service that are within the identified context.

In another aspect, the present disclosure is directed to a system for managing client-side services. The system can include one or more processors for implementing an intermediary between a plurality of client devices and at least one server. The system can include a metadata processor of the intermediary. The metadata processor can receive metadata from a first client device of the plurality of client devices. The metadata can include runtime characteristics of a first instance of a service that is incorporated into a client-side application or a web application. The first instance can execute on the first client device and can request service data from the at least one server. The metadata processor can detect an anomaly in the operation of the first instance of the service. The metadata processor can identify an operation of the first instance of the service causing the detected anomaly. A mitigation component of the intermediary can, responsive to the detected anomaly, cause delay, removal or modification of operations corresponding to the identified operation, in other instances of the service executing on the plurality of client devices. Each of the other instances of the service can be incorporated into a corresponding client-side application or web application, and execute on a corresponding one of the plurality of client devices.

In some embodiments, the runtime characteristics of the first instance of the service includes at least one of: a count of requests made by the first instance for the service data, a uniform request locator (URL) referenced in a request by the first instance, a start time of the request, a duration for responding to the request, a priority of the request, or an invocation path of the request. The runtime characteristics of the first instance of the service can include a script execution error, a failure in a request for the service data, or an error in hypertext markup language (HTML), detected by an agent executing on the client device.

The metadata processor can detect the anomaly in the operation of the first instance of the service, by comparing the detected runtime characteristics with historical data from instances of the service maintained in a storage device. The system can include a storage device configured to store the received runtime characteristics of the first instance. The metadata processor can identify the service or to categorize the service as a new service, responsive to comparing the received runtime characteristics of the first instance to a repository of information about services. The anomaly can include a delay in receiving service data requested from the at least one server, a script execution error, an unexpected modification or disparity in a user interface of the first instance, a disparity in size or content of the requested service data, a disparity in content of a request to the at least one server, or a statistical difference between the runtime characteristics and historical data.

The metadata processor can determine an operation of the service causing the detected anomaly. The determined operation can include invocation or initiation of the first instance, request to the server for the service data, configuration of the first instance, modification of a user interface of the first instance, or collection of analytics via the first instance. The metadata processor can identify a context of the service affected by the detected anomaly. The context can include at least one of: a geographical domain of the client device, a type of the client device, a type or version of the client-side application used with the service, or a page of the web application using the service. The metadata processor can delay, remove or modify the operations corresponding to the identified operation, in other instances of the service that are within the identified context.

In some aspects, described herein are systems and methods for orchestration using predictive service congestion control. The present systems and method can incorporate the use of an intermediary operating between one or more client devices and at least one server of the client/web application, which collects metadata from the one or more client devices pertaining to the loading, use and/or operation of services incorporated into various web and client applications on the one or more client devices. The intermediary can include a configuration engine to generate and provide a configuration to an agent executing on one of the client devices, for use in managing loading of services from the at least one server onto the web application or client-side application. The configuration can include information about an expected amount of bandwidth to be utilized for loading a corresponding service from the at least one server onto the web application or client-side application, and a loading priority for the service. The agent can determine bandwidth available to the client device and use this information with the configuration to control the loading of services in a particular order or sequence.

In yet another aspect, this disclosure is directed to a method for managing client-side services. An intermediary may receive from an agent incorporated into a web application or client-side application and executing on the client device, a request for a configuration to manage loading of services from the at least one server onto the web application or client-side application. The intermediary can determine an expected temporal pattern of use for at least some of the services at the client device. The intermediary can generate the configuration. The configuration can specify for each of the services, an expected amount of bandwidth to be utilized for loading the corresponding service from the at least one server onto the web application or client-side application, and a loading priority according to the expected temporal pattern of use. The intermediary can send the configuration to the agent executing on the client device, to cause the agent to request the services from the at least one server in a sequence according to the configuration and to bandwidth determined by the agent that is available to the client device.

In some embodiments, the intermediary can cause the agent to request the services in a sequence according to hardware resources available on the client device, to the configuration, and to the bandwidth available to the client device determined by the agent. The intermediary can determine, for a first service of the services, according to historical data, at least one of: a number of requests expected from the web application or client-side application to the at least one server to load the first service, an expected response time of the at least one server to a request from the web application or client-side application to load the first service, an expected speed for loading the first service from the at least one server to the web application or client-side application, or an expected loading progression pattern for the first service. The intermediary can generate the configuration. The configuration can specify for the first service at least one of: the number of requests expected from the web application or client-side application to the at least one server to load the first service, the expected response time of the at least one server to a request from the web application or client-side application to load the first service, the expected speed for loading the first service from the at least one server to the web application or client-side application, or the expected loading progression pattern for the first service.

In certain embodiments, the intermediary can generate a loading priority for a first service of the services, according to at least one of: a number of requests expected from the web application or client-side application to the at least one server to load the first service, an expected response time of the at least one server to a request from the web application or client-side application to load the first service, an expected speed for loading the first service from the at least one server to the web application or client-side application, an expected loading progression pattern for the first service, a user interface location of the first service on the web application or client-side application, an expected temporal pattern of use of the first service, or an expected amount of bandwidth to be utilized for loading the first service from the at least one server onto the web application or client-side application.

In some embodiments, the configuration further specifies to load the services onto the web application or client-side application according to a sequence established by weighting the loading priorities of the services with corresponding amounts of bandwidth expected to be utilized for loading the corresponding services. The configuration can further specify to load the services onto the web application or client-side application according to the loading priorities of the services. The intermediary and/or the agent can prioritize the loading of the services within a specified time constraint or a specified bandwidth. The intermediary can generate the configuration automatically or via user input. The intermediary can receive or monitor runtime characteristics of the services. The intermediary can maintain the received runtime characteristics in a storage device. The intermediary can track user interaction with a first service of the services, wherein the configuration specifies a loading priority for the first service according to the user interaction.

In a further aspect, the disclosure is directed to a system for managing client-side services. The system can include one or more processors for implementing an intermediary between a client device and at least one server, the intermediary including a configuration engine. The configuration engine can receive from an agent incorporated into a web application or client-side application and executing on the client device, a request for a configuration to manage loading of services from the at least one server onto the web application or client-side application. The configuration engine can determine an expected temporal pattern of use for at least some of the services at the client device. The configuration engine can generate the configuration, the configuration specifying, for each of the services, an expected amount of bandwidth to be utilized for loading the corresponding service from the at least one server onto the web application or client-side application, and a loading priority according to the expected temporal pattern of use. The configuration engine can send the configuration to the agent executing on the client device, to cause the agent to request the services from the at least one server in a sequence according to the configuration and to bandwidth determined by the agent that is available to the client device.

In certain embodiments, the configuration engine can cause the agent to request the services in a sequence according to hardware resources available on the client device, to the configuration, and to the bandwidth available to the client device determined by the agent. The configuration engine can determine, for a first service of the services, according to historical data, at least one of: a number of requests expected from the web application or client-side application to the at least one server to load the first service, an expected response time of the at least one server to a request from the web application or client-side application to load the first service, an expected speed for loading the first service from the at least one server to the web application or client-side application, or an expected loading progression pattern for the first service. The configuration engine can generate the configuration, the configuration specifying for the first service at least one of: the number of requests expected from the web application or client-side application to the at least one server to load the first service, the expected response time of the at least one server to a request from the web application or client-side application to load the first service, the expected speed for loading the first service from the at least one server to the web application or client-side application, or the expected loading progression pattern for the first service.

In some embodiments, the configuration engine can generate a loading priority for a first service of the services, according to at least one of: a number of requests expected from the web application or client-side application to the at least one server to load the first service, an expected response time of the at least one server to a request from the web application or client-side application to load the first service, an expected speed for loading the first service from the at least one server to the web application or client-side application, an expected loading progression pattern for the first service, a user interface location of the first service on the web application or client-side application, an expected temporal pattern of use of the first service, or an expected amount of bandwidth to be utilized for loading the first service from the at least one server onto the web application or client-side application. The configuration can further specify to load the services onto the web application or client-side application according to a sequence established by weighting the loading priorities of the services with corresponding amounts of bandwidth expected to be utilized for loading the corresponding services. The configuration can further specify to load the services onto the web application or client-side application according to the loading priorities of the services.

In certain embodiments, the configuration engine and/or the agent can prioritize the loading of the services within a specified time constraint or a specified bandwidth. The configuration engine can generate the configuration automatically or via user input. The system can include a metadata engine of the intermediary, configured to receive or monitor runtime characteristics of the services. The metadata engine can maintain the received runtime characteristics in a storage device. The metadata engine can track user interaction with a first service of the services, wherein the configuration specifies a loading priority for the first service according to the user interaction.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 2B and 2C are flow diagrams depicting embodiments of process steps in a method for dynamically modifying a requested web page from a server for presentation at a client;

FIG. 3B is an example representation of a collection of services and associated metadata;

FIG. 3C is an example representation of information about services maintained in a service repository;

FIG. 3D shows an example embodiment of a user interface for managing a service of a service repository;

Figure 1A:
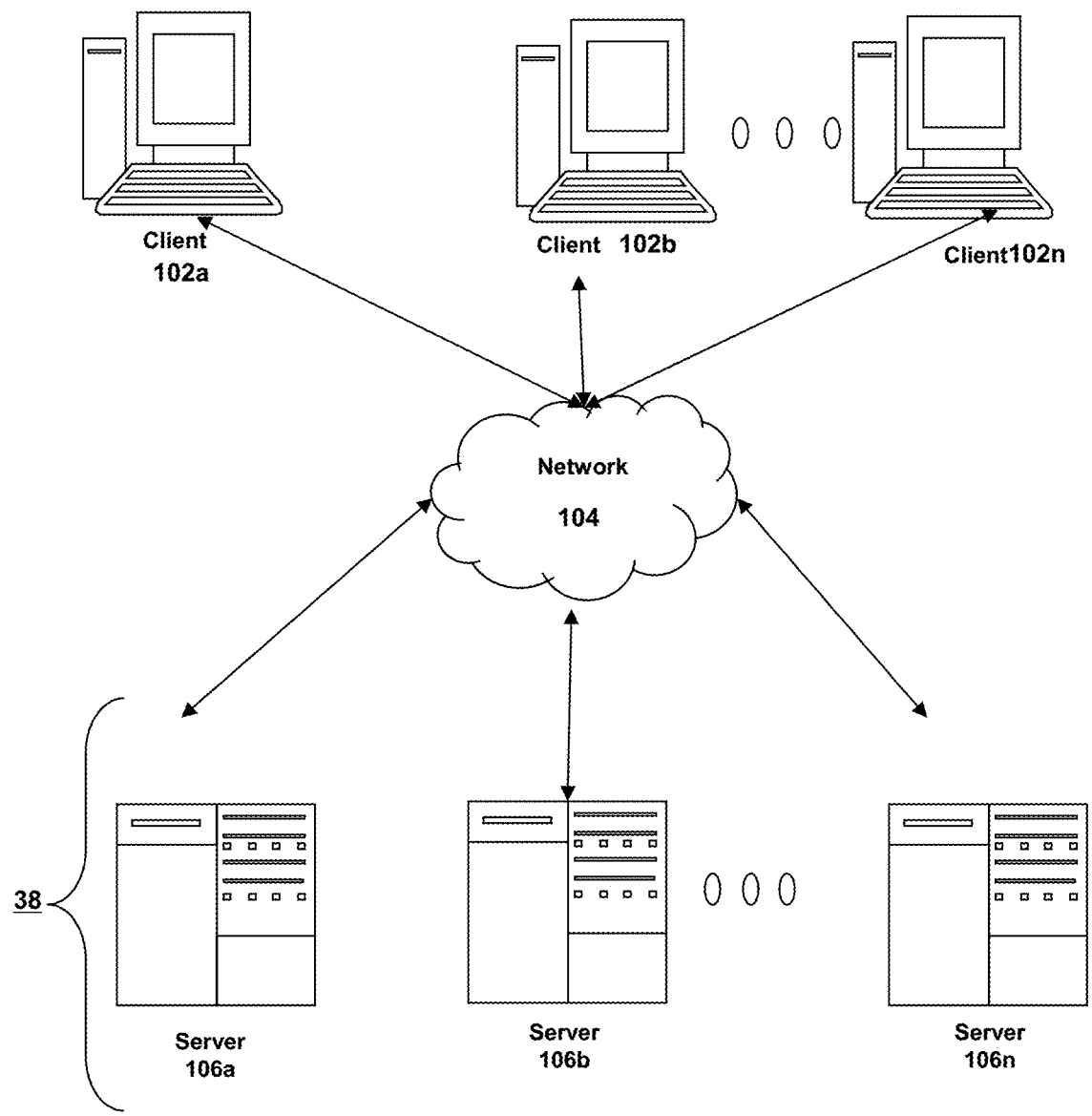
FIG. 1A is a block diagram depicting an embodiment of a network environment comprising client machines in communication with remote machines.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for dynamically modifying a requested web page from a server for presentation at a client; and Section C describes embodiments of systems and methods for governing client-side services.

Section D describes embodiments of systems and methods for orchestration using predictive service congestion control.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 206b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
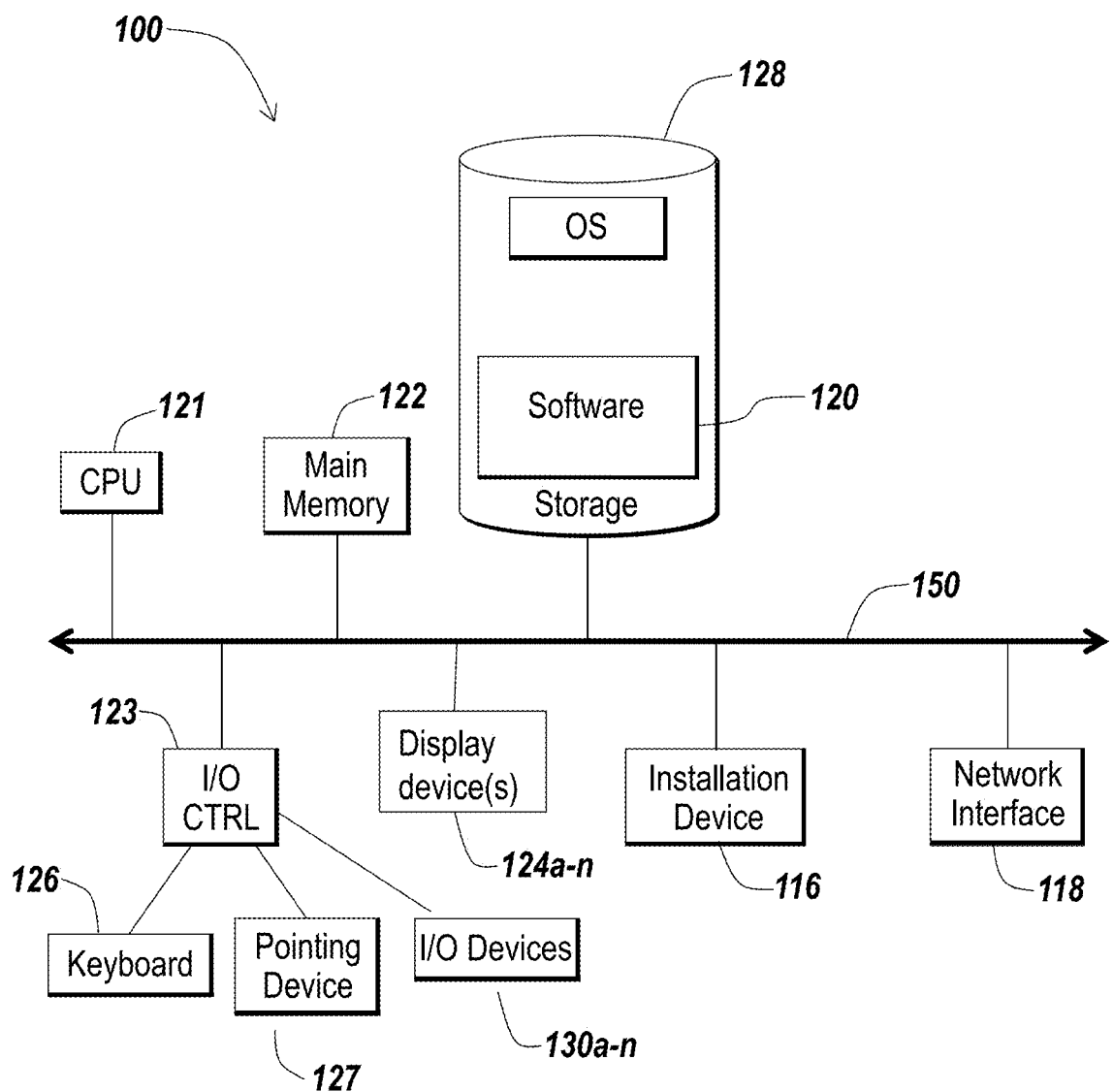
FIGS. 1B and 1C are block diagrams depicting embodiments of computing devices useful in connection with the methods and systems described herein.
Figure 1C:
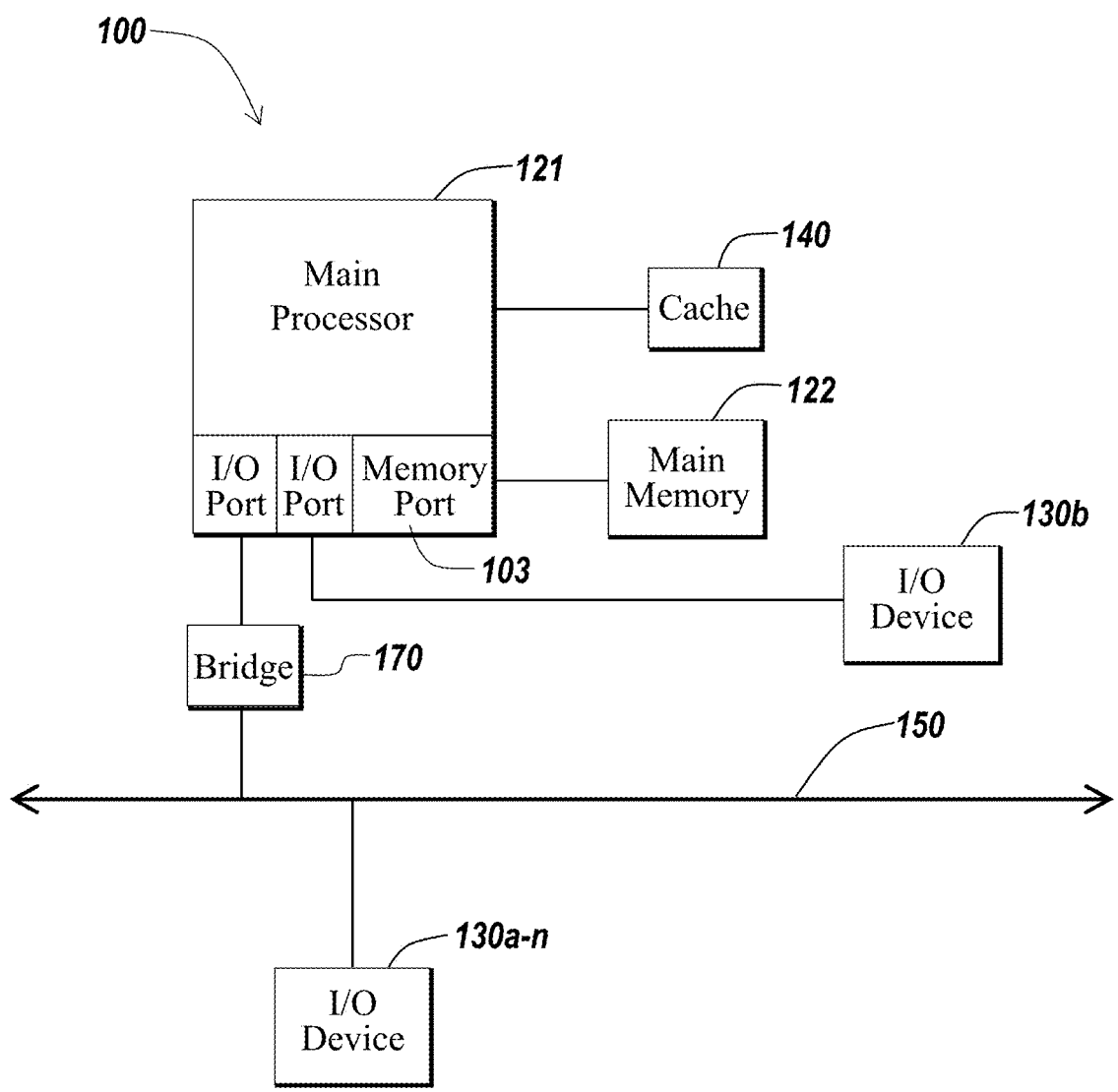

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (B SRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program or software for implementing (e.g., software configured, designed and/or customized for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/ Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 player. In yet other embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Dynamically Modifying a Requested Web Page from a Server

Described herein are systems and methods for dynamically modifying a requested web page (e.g., web application) from a server at an intermediary for presentation at a client. The present systems and methods can provide real time intervention via a cloud service or at an intermediary, upon receiving a client's request for a web page of a server. The intermediary may manage content and/or resources delivered to the client while communicating with the server to process or fulfill the request. The intermediary may provide a plurality of HTML fragments that can be assembled into a modified web page for the client, in response to the request. The fragments may be delivered sequentially and in a controlled manner (e.g., as data is available at the intermediary and/or from the server), for processing by the client's browser and presented to the user. This can lead to improved or enhanced system performance (e.g., using caching methods) and/or user experience.

The intermediary may be configured to inject or incorporate code into a fragment for transmission to the client. The code may be executed by the browser (e.g., in the background) as the fragments are loaded or rendered as part of the modified web page. In some embodiments, the code may be intelligently configured to perform certain actions that modify the web page or affect some aspect of a resource of the web page. The web page may be modified to improve user experience. For example, the code may, upon execution, pre-fetch a resource for faster loading at a right moment, provide cookie management for enhanced web-based interactions, incorporate third-party resources to a web page, or alter certain characteristics of resources. A requested web page may therefore be modified dynamically at the intermediary and assembled at the client without affecting how the server generates its web pages. Code injected into the fragments can execute in the background as each fragment is loaded onto a browser, altering web page features without the user even realizing. The code-based processing produces an improved user experience, e.g., a richer experience with additional or custom content, an improved or more appropriate web page layout, or a more responsive loading or rendering of web page elements.

Figure 2A:
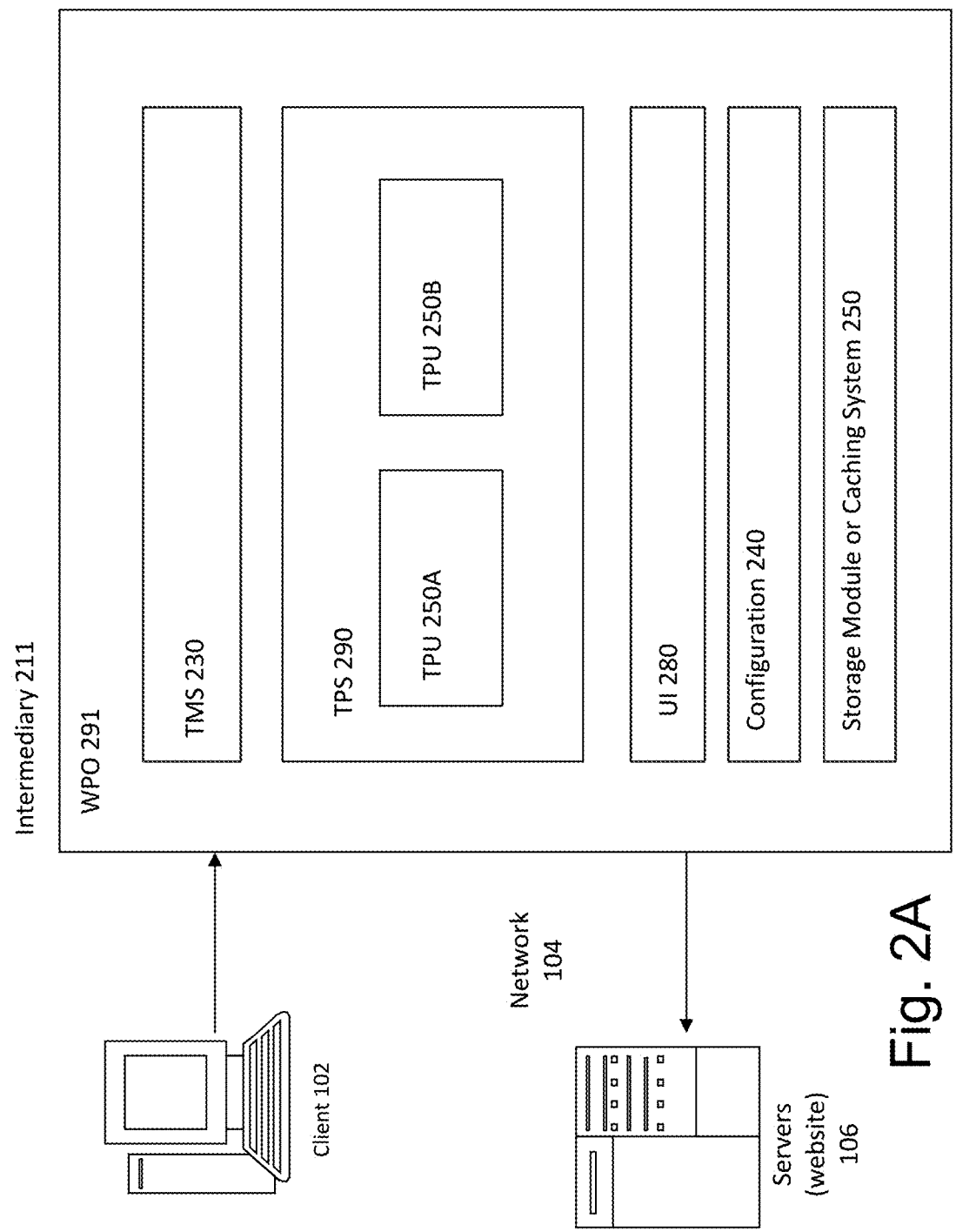
FIG. 2A is a block diagram depicting one embodiment of a system for processing a request for a web object.

Referring to FIG. 2A, one embodiment of a system for dynamically modifying a requested web page from a server for presentation at a client is depicted. In brief overview, the system may include an intermediary between at least one client device and at least one server. The intermediary may include a web performance optimization system (WPO) 291. The WPO may include a traffic processing system (TPS) 290, a traffic management system (TMS) 230 and a customizing user interface (UI) 280. The TPS 290 may include geographically-dispersed or cloud-based traffic processing units (TPU) 250. The TPS 290 may receive and process HTTP (or HTTPS) requests and responses between a client and a server or website, and the TMS may manage routing of client requests through the TPS. In various embodiments, the intermediary (e.g., including the TPS 290, TPU 250) itself or some element/feature of the intermediary can reside on or be part of the client 102, or can correspond to a device or network node separate from the client 102.

In the present disclosure, although HTTP may sometimes be referenced by way of example, HTTPS or an alternative scheme is contemplated and within the scope of this disclosure. A user or third party may use the customizing user interface and/or an application programming interface (API) to query, add, remove and adjust a setting, status or configuration of the WPO system to achieve desired results.

When a client issues a HTTP request to a server or website, the HTTP request may be directed to pass through the intermediary. Upon receiving HTTP request (e.g., via the TMS), the TPS may analyze the HTTP request (e.g., determine the client type), select and apply context-specific optimization techniques to deliver appropriate fragments for assembly into a modified web page.

The intermediary may include a hardware device such as an appliance, network component, proxy, router, or any combination thereof. In instances where an intermediary device is referenced, the intermediary device may comprise any one or more of the above-mentioned components (e.g., TPS, TMS) within a single device or a collection of networked devices. Each of the components may embody hardware, or a combination of hardware and software (e.g., program code executing on hardware of the intermediary).

The WPO can deliver dynamic content from an originating server to one or more clients via partial object caching and client-side processing. An object may, for example, include a web page, and a partial object may include a fragment of a web page. Instead of connecting to the server directly, a client may communicate with the server via an intermediary device. The intermediary may store cached copies of content and other resources from the server. The cached copies may have been identified and extracted based on prior interactions with the server and/or client. When a client requests for an object such as a web page, the intermediary may return a partial object from its cache almost immediately, e.g., while the intermediary is requesting the object from the server.

The intermediary may employ client-side pre-fetch which allows the WPO to send a fragment or segment of an HTML page (e.g., the "head") as quickly as possible in response to a request. This can accelerate the loading process by allowing a corresponding browser to start the downloading and rendering process in parallel to the server-side processing of the web page request. Once the object from the server is returned responsive to the request, the intermediary may compare the returned object to the delivered partial object from its cache. The intermediary may find any differences based on the comparison, and may deliver the differences to the client. In conjunction with or in between delivery of the partial object and differences, the intermediary may provide the client with client-side processing instructions or injected code. The client (e.g., a browser of the client) may execute the code or instructions while loading or rendering fragments of the web page.

Figure 2B:
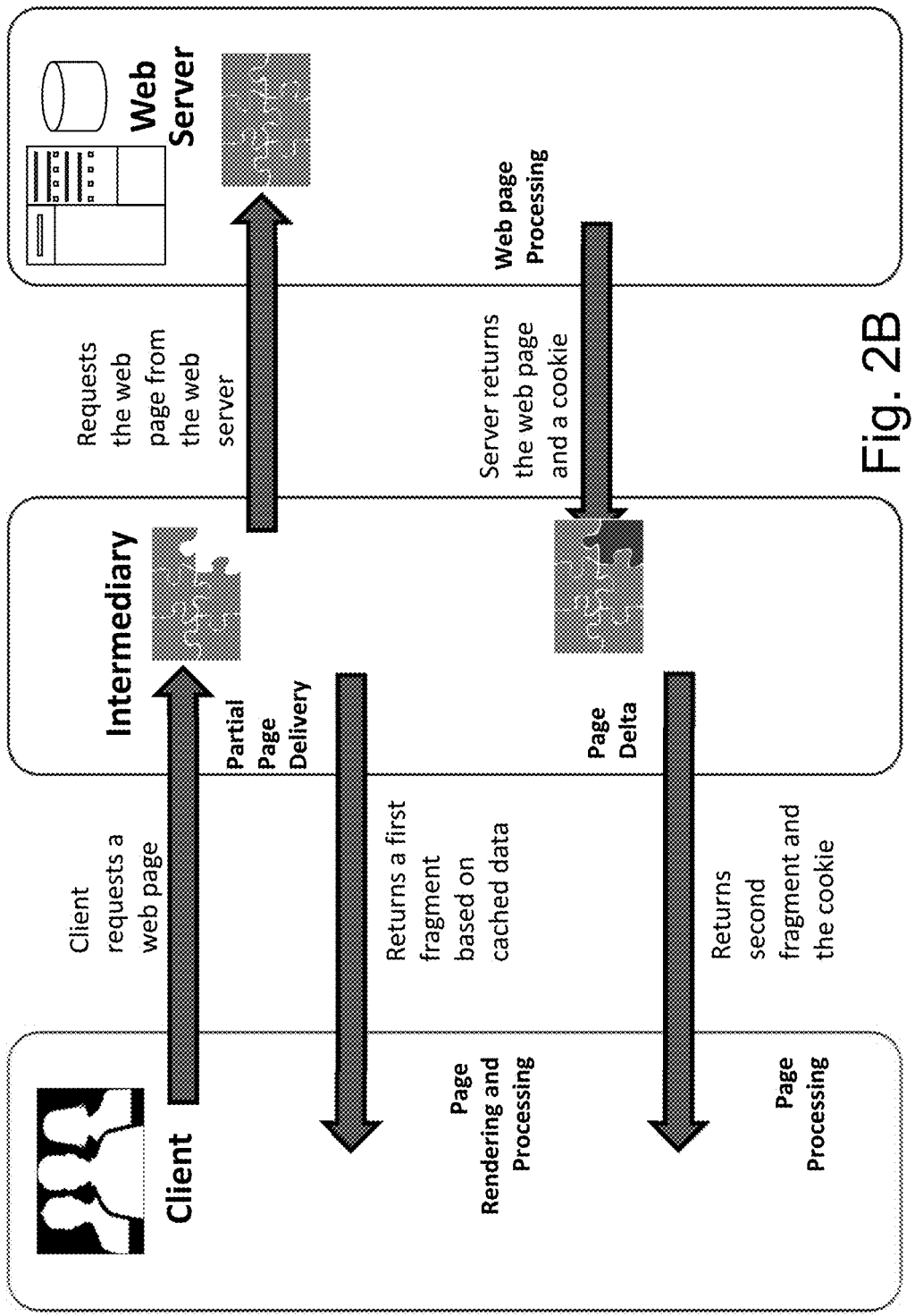

By way of example, embodiments of a method for dynamically modifying a web page are depicted in FIGS. 2B and 2C. Referring to these figures, a prior request for a web page from a server may involve the following illustrative HTML source file:

---
Original Source File
---
```
<html>
    <head>
        <link href="//www.foo.com/style.css" rel="stylesheet"
type="text/css"></link>
        <script src="//www.foo.com/jquery.js"></script>
        <script src="//www.foo.com/app.js"></script>
    </head>
    <body>
        <!—ADDITIONAL/OPTIONAL MATERIAL -->
    </body>
</html>
```
---

Some portions of the web page may be cached by the intermediary. Once the page is in cache, and in response to a subsequent request for the web page, the WPO system may respond immediately with a HTML fragment, for example up to the "<body>" tag from the cached copy (e.g., as shown in FIG. 2B):

---
Initial Part/Fragment Returned To The Client
---
```
<html>
    <head>
        <link href="//www.foo.com/style.css" rel="stylesheet"
type="text/css"></link>
        <script src="//www.foo.com/jquery.js"></script>
        <script src="//www.foo.com/app.js"></script>
    </head>
```
---

The TPU may inject or incorporate code into the initial fragment delivered to the client. In the embodiment depicted in FIG. 2C, an initial first fragment is not shown. In parallel, the Traffic Processing Unit (TPU) of the WPO system may convey the request for the webpage to the server. When the TPU receives a response back from the server, the TPU may extract a difference or delta from the web page, relative to the static portion in the initial fragment, to form a second fragment. The difference or delta may include one or more dynamic portions of the requested web page. The TPU may add code, e.g., which may include a "<script>" block that can set any cookie that the server responded with using a Set-Cookie header, to the response or second fragment (e.g., YoResponse, as depicted in FIG. 2C):

---
Code injected into Subsequent Returned
Part/Fragment To The Client
---
```
<script>
    //This code can be executed on a browser.
    function setCookie(name, value, expires, path){
        var exdate=new Date( );
        exdate.setDate(exdate.getDate( ) + exdays);
        var c_value=escape(value) + ((exdays==null) ? "" : ";
expires="+exdate.toUTCString( ));
        document.cookie=c_name + "=" + c_value;
    }
    //Set each cookie the server responds with.
    setCookie("session", "12312312312123", new Date(2013, 12, 31),
"");
</script>
```
---

If the code is added directly to the response received from the server, the TPU may, in this case, remove content that has already been sent to the client (e.g., the initially returned part/fragment). The TPU may send the remainder of the content (and the injected code) to the client, for example:

---
The Remaining Response
---
```
<body>
        <!-- ADDITIONAL/OPTIONAL MATERIAL, e.g., dynamic
portions of the web page, injected code -->
    </body>
</html>
```
---

Web pages may be made up of many different web resources (e.g., services) that vary in their content-type and purpose. Each web resource may be stored and requested individually on a web server. This web page structure can make deployment of web pages and websites easy. However, the issue with this deployment model is that the web browser may need to request each of the web resources individually. The web browser may request one web resource and then process it to see if other web resources are needed. If more resources are required, the browser may request them one at a time and then it will repeat the process. Today's websites typically require many web resources to create the interactivity and presentation envisioned by their designers. Ajax, Web 2.0, and Collaboration websites all lead to an increase in the interactivity and design required to acquire and keep customers. Developers may design and implement web pages by breaking up the page into images, JavaScript, CSS, HTML, media (Flash, Sound, Video) and other resources. Developers do this in a way that makes it quick to build, debug, deploy, test, and maintain. This web page development process usually results in resources (e.g., services) being broken down into specific tasks including, JavaScript files that implements a specific set of tasks, CSS files that manage the presentation of a certain section, component or element of a page, and images that display one graphical element of a page. However, browsers may be able to open only a limited number of connections to the web server. For instance, if the browser can only create two connections with a web server, resource requests may queue up until a previous resource is completely downloaded.

Typically, the loading of the assets/resources may not happen until the end, after the last byte of a web page. This can waste significant amounts of waiting time, impairing user experience. The WPO can deliver the initial fragment with injected code so that the browser can start to immediately begin the parallelization process of downloading the required assets. For example, the WPO may add JavaScript to the end of the first delivered fragment or HTML section (e.g., into a head section) to load resources or images, instead of waiting for the HTML that include the images. Even certain resources referenced in the page body may be moved into the <head> tag. For a certain web page, the "head" or static portion(s) may be identified by a user via the UI of the intermediary. The WPO may re-order code/scripts that are loaded at the end of the web page file to the beginning. If the browser can begin loading assets, for example, within 100 ms or less from the request, there can be significant page speed increases.

The WPO may incorporate code into a web page fragment that can intelligently modify an aspect of the originally-requested web page. For example, upon execution, the code may direct specific images (e.g., of a social plugin) from a website to load if and/or when these images are viewable to visitor. For example, images that are hidden in a background, cached, or configured to be invisible, may be identified and excluded/delayed by the code from loading and slowing down the page load. Based on specific requirements, a user may configure the code to manage images relative to a viewport. A viewport in a browser tab is the viewable area of a page. For example, a user may configure the code such that when a page on a website is loaded in a visitor's browser tab, all images within viewport may be loaded immediately. A user may configure the code to manage images such that only those images viewable to a visitor when the visitor scrolls on the page, may be loaded when in viewport.

In some embodiments, the WPO may incorporate code to load all or certain social plug-in scripts on a web page when the corresponding document object model (DOM) structure (e.g., HTML source) is ready. The WPO may recognize social plug-ins by their signature string. For example, a Facebook script tag may have a source attribute value: "//connect.facebook.net/en_US/all.js#xfbml=1". In some embodiments, the WPO may incorporate code to load images in a web page slideshow when a visitor performs an action, e.g., clicks a *next* button. The WPO may identify such elements in a web page, for example, an image is a slideshow may have a CSS class "slide-img" and the next button may have a CSS class "slide-btn-next".

In another illustrative example, a web page may place a quoted tweet in the top half of a web page, but locate a related Tweeter script tag at the bottom of the page. The WPO may incorporate code to advance or execute the script tag so that the tweet may be fully functional when loaded. The WPO may incorporate code to configure a social plugin script tag to load when the corresponding social plugin is viewable.

Web pages may include one or more widgets or services, such as pixel tags, beacons, social media plugins, images, analytics trackers or agents, media files, and trust shields or badges. Examples of such widgets include: a VeriSign logo, Google analytics agents, Hubspot plugins, and Marketo agents. When WPO detects a widget from a web page, the WPO may direct a request for JavaScript and/or images associated with the widget, to the WPO or TPU's optimizer for handling.

In some embodiments, the WPO may incorporate code into the modified web page to handle the various types of widgets or plug-ins, including third party widgets (e.g., from Facebook, Twitter and Pinterest). Categories of third party widgets include at least the following: (i) Widgets for Facebook, Twitter, Pinterest, Google+, Add this, etc.; (ii) Badges, logos or trust shields, for example, from VeriSign; (iii) Ads, for example, resulting from Google ad words; and (iv) Beacons or agents, for example, from Google Analytics, Marketo, etc. In some embodiments, the WPO may handle ads in a way that is simpler than the handling of widgets, e.g., allow ads to be delay loaded.

The WPO may allow for customization of a configuration of the code, e.g., by a user via the UI. For example, the WPO may allow a user to select or identify specific widgets for targeted processing or handling. The WPO may allow the user to specify when the widget should be injected or loaded onto the page (e.g., disable, X milliseconds after an onLoad event). The WPO may allow a user to change or replace existing widget injection instructions, e.g., change <script src=" "> and inline <iframe> into asynchronous injected widgets. The WPO may allow a user to specify a location within the page into which an <iframe> tag may be injected.

In certain embodiments, the WPO may control the injection of widgets via a JavaScript (JS). The WPO may check or verify if such a script is already injected and if not, add, move, replace or otherwise modify the script into the head node or section of a web/client application. The added/modified script can then handle the injection and/or display of the widget.

In some embodiments, widgets may be injected via an iframe. The WPO or a user may identify (e.g., locate and indicate) the position of the iframe, for example, via the UI. The WPO may include a library to listen for changes to the DOM and implement the client-side functionality. The library may be Javascript-based, and can be used to manage the scripts and iframes discussed above. In some embodiments, widgets may be loaded in external JS files, and loaded within a sandbox. These widgets may be ignored, or handled differently or similarly to that described above. For example, the widget injection code may be modified to be inline, or the code may be injected into that JS file to affect widget handling within that JS file.

The WPO may use injected code to delay the loading of specific images. Using delay loading may be useful, for example, on blogs and product listing pages, web pages that include many images. To handle images, the WPO may have to perform image selection. This may involve finding and identifying the right images (e.g., to delay load), selecting multiple images, and controlling an appropriate number of images to select. The WPO may in some cases, use URL matching techniques to select images. The WPO may perform image selection using a standard, custom or proprietary query language. The WPO may perform selection of images based on one or more criteria, including DOM position.

The WPO may identify and handle existing iframe tags in a requested web page. Iframe tags may block the loading of an application and can cause long delays in page load. The WPO may handle iframe tags by code injection into the delivered, modified web page. For such tags, the WPO may process these using ASK to provide the corresponding code for injection. An iframe loader of the ASK client (e.g., yo_iframeLoader) may perform the actual loading of the iframe based a configuration. The WPO may handle at least two types of iframe injection. By way of illustration, the following iframe tag:

```
<iframe
src="http://seal.stellaservice.com/seals/stellaservice_excellent.png?c
=3010"></iframe>
    may be changed into, or replaced with the following code snippet:
       <iframe src="data:text/html;plain,<html><body></body></html>"
           onload="yo_iframeLoader(event)"
           onerror="yo_iframeLoader(event)"
yo_src='http://seal.stellaservice.com/seals/stellaservice_excellent.pn
g?c=3010'
           yo_delayType='timer'
           yo_delayValue='1550'></iframe>
```

In some embodiments, the WPO may detect the insertion of a iframe tag into the DOM using the AfterShocK client library. The WPO may use the library to manage or perform code/JS injection into the modified page, for example:

```
$("#here").append('<ifr'+'ame
src="//www.facebook.com/plugins/likebox.php?href=http%3A%2F%2Fwww.fa
cebook.com%2Fplatform&width=292&height=590&show_faces=tr
ue&colorscheme=light&stream=true&border_color&header
=true&appId=20152740944" scrolling="no" frameborder="0"
style="border:none; overflow:hidden; width:292px; height:590px;"
allowTransparency="true"></ifr'+'ame>');
```

Configuration of these components may be handled by the following illustrative statements:

```
yo_configureAfterShock({ defaultDelay: 5000, resources:
[{url:"//www.facebook.com/plugins/likebox.php?", delayType: "timer",
delayTime: "5000"}] });
```

The WPO may generate HTML fragments or injected code to handle waiting images. For iframes and images, the WPO may allow customization of an image displayed while the component has not been loaded. By default, an image (img) may use a transparent 1-pixel gif, for example:

```
data:image/gif;base64,R0lGODlhAQABAAAAACH5BAEKAAEALAAAAAABAAEAAAICTA
EAOw==and an iframe may use the following, for example:
data:text/html;plain,<html><body></body></html>
```

The WPO may allow customization of such default content for images. For example, the WPO may allow customization to provide a specific URL, so that user of the WPO system may add a wait cursor via the URL to the modified page, for example. The URL may allow a data URI incorporation of data, inline to a web page. The WPO may allow customization to provide an optimized version for each encountered image in the requested page. For example, if a user is requesting for a web page from a mobile device, the WPO may provide for an extremely compressed image that is no larger than 2 kb in size, for example.

In some embodiments, the WPO may provide the code for injection. The WPO may store or maintain a base code, which may comprise a configuration for configuring or specifying the injected code. The injected code may comprise the ASK client code. In some embodiments, injected code received by a number of clients for a plurality of web pages may be the same or substantially the same. For example, a full or minimized version of the ASK client code may be accessed from a database (e.g., of the intermediary), or from an online repository (e.g., via a URL), for incorporation into a web page fragment.

The WPO may provide a different configuration to each client and/or for each web page, for example, to configure the injected code to behave or operate differently between two clients and/or two web pages. In some embodiments, a configuration specific to a client and/or web page may be used to configure, specify or otherwise generate a piece of code at the intermediary for injection into a particular fragment. In other words, the injected code may be unique to a client (or user) and/or a web page.

By way of illustration, one embodiment of a base code or configuration is depicted below:

```
{
        "_id": "51d32ddf63e31e2d9000074f",
        "name": "Aftershock",
        "enabled": true,
        "last_modified": "2013-07-02T19:45:57Z",
        "token": "6",
        "_type": "Platform::DocumentRule",
        "match": [
                {
                        "_id": "51bb222a86305e35e90000f6",
                        "name": "URI",
                        "type": "0",
                        "operator": "CONTAIN",
                        "condition": "/"
                }
        ],
        "actions": {
                "_id": "51d32ddf63e31e2d90000750",
                "htmlInsert": [
                        {
                                "_id": "51d32ddf63e31e2d90000751",
                                "enabled": true,
                                "filters": [ ],
                                "content": "<script>//Fill in with the latest aftershock client code.</script>"
                        }
                ],
                "transformer": [
                        {
                                "enabled": true,
                                "comment": true,
                                "merger": true,
                                "item": [
                                        //See the Tag Handler Section
                                ]
                        }
                ],
                "asyncJs": [ ],
```
```
                "prefetch": [ ],
                "cssCombination": [ ],
                "jsCombination": [ ],
                "cssSprite": [ ],
                "urlRewrite": [ ] ,
                "dataURI": [ ],
                "badAssetRemoval": [ ],
                "responsiveImage": [ ],
                "clientPrefetch": [ ],
                "cssInline": [ ],
                "jsInline": [ ]
        }
}
```

In some embodiments, the base code may be used to include the ASK client, or to access the ASK client at the client/browser. In certain embodiments, the ASK client uses the base code to configure the injected code to operate in a particular manner at the client/browser. The base code may incorporate, or be used to access code that performs transformation and/or optimization of an aspect of the page, which may improve user experience. The base code or configuration may be based on a default configuration and/or user-customization from default settings. A user, such as an administrator or a representative of a website, may specify or customize a configuration for a web page via a UI and/or API of the intermediary.

In some embodiments, the UI may provide access to an option for WPO to discover any tags or services within a requested web page. WPO may automatically recognize or identify different types of tags or services (e.g., iframe, image, script, video, object) via known signatures (e.g., URL patterns, DOM position). By way of illustration, injected code may be configured to modify a default rendering characteristic of a tag, e.g., make an iframe tag load on-demand. Certain tags may be left un-optimized, e.g., without any configured action, or without any change to its default rendering characteristic(s). In some embodiments, a user may identify a tag to configure an action via injected code.

Figure 2D:
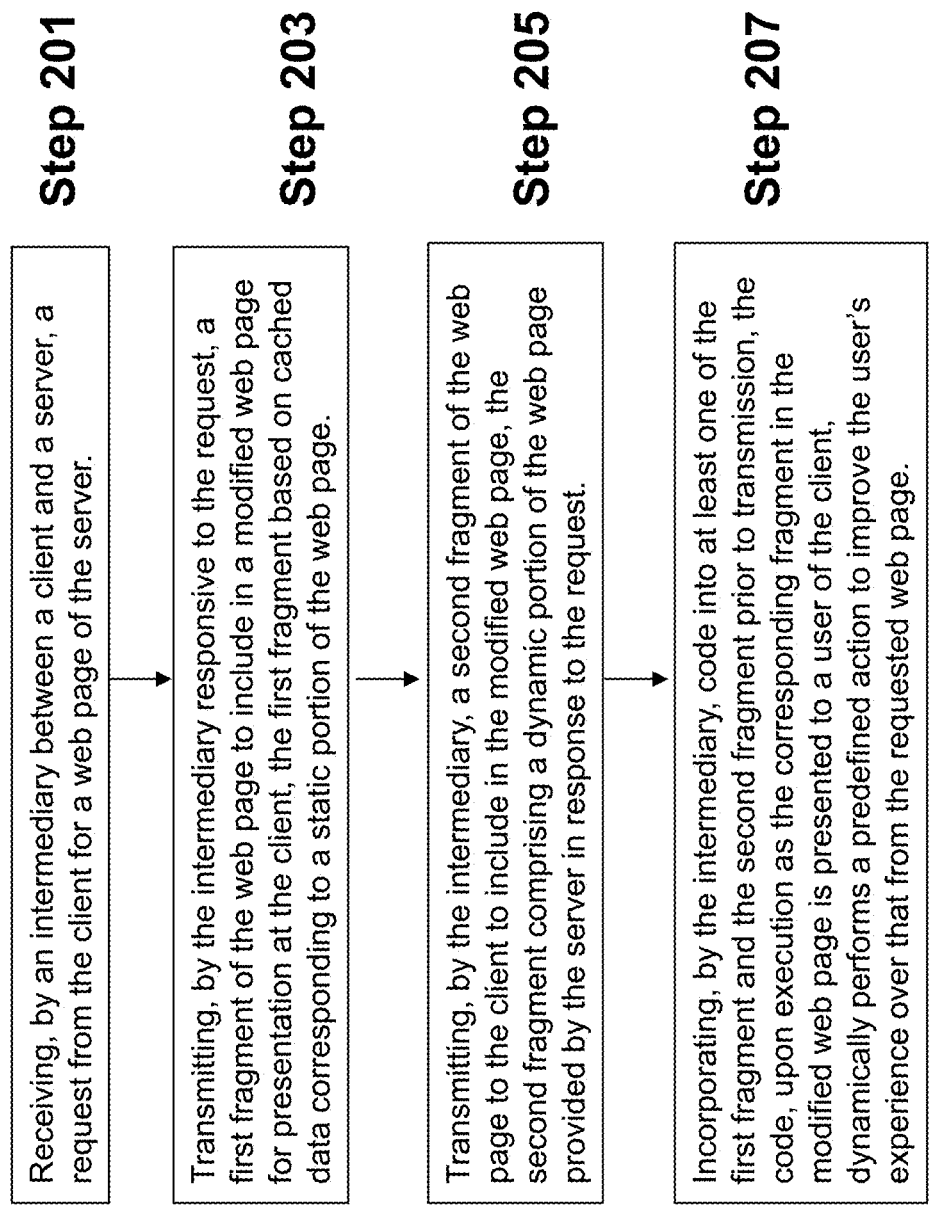
FIG. 2D is a flow diagram of an embodiment of a method for dynamically modifying a requested web page from a server for presentation at a client.

Referring now to FIG. 2D, one embodiment of a method for dynamically modifying a requested web page from a server for presentation at a client is depicted. The method may include receiving, by an intermediary between a client and a server, a request from the client for a web page of the server (201). The intermediary may transmit, responsive to the request, a first fragment of the web page to include in a modified web page for presentation at the client (203). The first fragment may be based on cached data corresponding to a static portion of the web page. The intermediary may transmit a second fragment of the web page to the client to include in the modified web page (205). The second fragment may include a dynamic portion of the web page provided by the server in response to the request. The intermediary may incorporate code into at least one of the first fragment and the second fragment prior to transmission (207). The code may, upon execution as the corresponding fragment in the modified web page is presented to a user of the client, dynamically perform a predefined action to improve the user's experience over that from the requested web page.

Referring now to (201), and in some embodiments, an intermediary between a client and a server receives a request from the client for a web page of the server. A browser of the client may generate the request based on a user action, such as a click on a link or an advertisement. The intermediary may intercept the request from the client. The intermediary may receive or intercept the request, comprising a HTTP or HTTPS request, from the client. In some embodiments, the client may be configured to transmit the request to the server via the intermediary. The intermediary may receive or intercept the request as a cloud service. The intermediary may process the request as a service or feature of an appliance, router, proxy device or any other network device or system. A TMS of the intermediary may receive and route the request to a TPS, embodiments of which were described above in connection with at least FIGS. 2A and 2B. The TPS may reside in the intermediary or comprise a network device or cloud service. The TPS may receive and process the request, for example, prior to requesting the server for the web page.

Referring now to (203), and in some embodiments, the intermediary may transmit, responsive to the request, a first fragment of the web page to include in a modified web page for presentation at the client. The intermediary may transmit the first fragment of the web page to for processing, assembly, loading, rendering, execution and/or presentation at the client, e.g., on a browser of the client. The first fragment may be based on cached data corresponding to a static portion of the web page. The TPS may access a cache of web page data corresponding to the requested web page. The cache may store or maintain web page data received from one or more servers, including the requested server and/or a mirror site of the requested server. The cache may store one or more components of a web page that may be static, e.g., a header section of the page.

The static portion may comprise elements of the page that do not change between multiple requests, requesting clients, geographical locations of the clients, browsers and/or users, or that do not change over a certain period of time. The static portion may be identified, determined, detected and/or inferred by the TPS over one or more requests for the web page. The static portion may be manually configured or identified by a user or administrator. In some embodiments, the static portion is identified via a comparison between a cached copy of the web page and a later copy provided by the server. The TPS may immediately transmit a first fragment of the page to the client, comprising the static portion of the page, for loading on a browser. Due to the availability of this fragment within a short period of time from the request, a user of the client experiences a more responsive and faster page load in association with the requested web page.

In some embodiments, the intermediary may transmit or convey the request for the web page to the server. The TPS may convey, direct, route or re-transmit the request to the server in parallel with the processing of the request at the intermediary. The TPS may send the request to the server during, before or after processing the request at the intermediary. In some embodiments, the TPS may modify the request, or generate a new request for the web page or for a portion of the web page. Responsive to the request, the server may generate a response comprising a web page, including a dynamic portion of the web page. The dynamic portion may, for example, be specific to the user, the client, the browser, geographical location and/or the time of the request. The server may send the web page and/or a cookie in one or more responses to the request. The server may send the one or more responses to the client or the intermediary, e.g., as each response becomes ready to send.

The intermediary may receive the requested web page from the server responsive to the request, the web page comprising at least the dynamic portion. The intermediary may receive a cookie from the server responsive to the request. The intermediary may receive or intercept the response on behalf of the client (e.g., via Cname or DNS redirection). The intermediary may identify and/or extract the dynamic portion from the response. The intermediary may identify and/or extract a difference or delta from the web page relative to the portion already returned to the client. In some embodiments, the TPS generates or forms a second fragment of the web page based on the difference/delta or the dynamic portion of the web page. The intermediary may form the second fragment as soon as, or responsive to receiving the response from the server.

Referring now to (205), and in some embodiments, the intermediary may transmit another fragment (e.g., a second fragment) of the web page to the client to include in the modified web page. This fragment may include a dynamic portion of the web page provided by the server in response to the request. The TPS may transmit the second fragment to the client as soon as the second fragment is generated. The intermediary may send or convey the cookie from the server to the client. The intermediary may incorporate code (e.g., Javascript, VBScript, ActionScript, a plug-in implemented in a language such as C, C++, a script referencing a browser plug-in, or a script referencing a native module) in the second fragment to set (e.g., maintain, update and/or identify) the cookie at the client for use in a further communication with the server.

In some embodiments, the intermediary may incorporate code in a different fragment (e.g., a third fragment) to set the cookie at the client for use in a further communication with the server. This fragment may be transmitted prior to, responsive to, concurrent with, during or after the transmission of the second fragment to the client. In some embodiments, the third fragment does not include or convey a dynamic portion and/or a static portion of the web page. The intermediary may transmit the corresponding cookie with the third fragment, or transmit the corresponding cookie in a message separate from the third fragment.

Referring now to (207), and in some embodiments, the intermediary may incorporate code into at least one of the fragments (e.g., the first, second and/or third fragments) prior to transmission to the client. The code may be implemented with an appropriate programming or scripting language, such as Javascript, VBScript, ActionScript, a plug-in implemented in a language such as C, C++, a script referencing a browser plug-in, or a script referencing a native module. The intermediary may incorporate or inject a particular type, set and/or collection of code depending on which fragment to which the code is being injected. The intermediary may incorporate a particular type, set and/or collection of code depending on at least one of: data cached in connection with the requested web page, a feature or characteristic of the web page, the requesting user, a characteristic of the client and/or client browser (e.g., client/browser type, geographical location, language preference, etc.), any injected code already delivered to the client via a prior fragment, and a configuration of the intermediary and/or server pertaining to code injection. The intermediary may inject or incorporate code to replace or modify existing code or features in the requested web page. For example, and in some embodiments, the intermediary may disable, modify and/or replace existing deferring or blocking scripts with Javascript code, as discussed above in connection with at least FIGS. 2A and 2B. The intermediary may incorporate or inject the code inline in a message (e.g., HTTP message), or in a separate script file referenced or attached to the message.

The code may, upon execution while the corresponding fragment in the modified web page is presented to a user of the client, dynamically perform a predefined action to improve the user's experience over that from the requested web page. The code may run, execute or be otherwise activated when the corresponding fragment is loaded or processed at a browser or other application of the client. The browser or client application may execute or run the code by loading the fragment. The browser or client application may execute or run the code as the fragment is loaded. At least a portion of the code may remain active or continue to run after the fragment is loaded. For example, the code may, continuously or for a period of time, poll, monitor or detect an action by the user, in the background. A portion of the code may execute after a configured delay, or be triggered by a page load event, browser event, DOM event and/or user action.

The intermediary may incorporate code in a multipurpose internet mail extensions (MIME) multipart message. The code may be injected into a HTTP message. The intermediary may transmit the one or more fragments in a MIME multipart message (e.g., one or more of the subtypes of a multipart message). The intermediary may transmit the one or more fragments via any type of HTTP message. The intermediary may incorporate code in a MIME multipart message to set the cookie at the client for use in a further communication with the server. The intermediary may transmit the first fragment, the second fragment and/or the third fragment via MIME multipart messages to include in the modified web page. The intermediary may transmit one or more of the fragments for assembly and/or processing at the client.

The intermediary may incorporate code based on a configuration of the intermediary. As discussed, the configured may be based on the client device type, browser type, the user, the geographical location, etc. The intermediary may incorporate code customizable via a user interface and/or an API. A representative of the server or web site, or an administrator, may customize the configuration based on knowledge of the web page, e.g., obtained via analysis of past traffic. The code may be configured to dynamically perform a predefined action, e.g., using a default and/or customized configuration provided by the intermediary and/or a user. The code may be injected, added or incorporated to operate at the client, e.g., in the background, without the user of the client realizing that the code is present or running. The code may be injected, added or incorporated to operate at the client, without requiring a change or modification at the server, e.g., to generate the web page. The code may be injected, added or incorporated to execute at the client without affecting how the requested web page is generated and transmitted. The code may be incorporated into the one or more transmitted fragments, to modify or alter a feature or characteristic of the requested web page. The code may be incorporated into the one or more transmitted fragments forming a modified version of the requested web page.

In some embodiments, the intermediary incorporates code that directs or requests the client's browser to perform a certain action. The intermediary may incorporate code that directs the client's browser to request for web page data corresponding to the client's device or browser type. For example, the intermediary and/or the injected code may detect that the client comprises a mobile device, or includes a browser with limited capabilities (e.g., lack of support for Flash). By way of an illustrative embodiment, the code may detect the client's device or browser type, or a capability thereof, via a client-agent attribute. The client-agent attribute may be configured in the client or included in the request. The code may direct the browser to request for web page data, of the identified web page, corresponding to the client's device or browser type. For example, the injected code may request for a portion of the web page data (for the requested web page) appropriate for the device/browser, e.g., that can be rendered on the device/browser.

In certain embodiments, the intermediary may incorporate code that directs the client's browser to request for another web page corresponding to the client's device or browser type. As described earlier, the intermediary and/or injected code may detect that the client comprises a mobile device, a large form-factor screen, or a browser with specific capabilities and/or limitations. Based on the detection, the code may be configured to direct or redirect the browser to request for a different web page, e.g., from the same web server or a different web server. For example and in some embodiments, the code may direct the browser to request a different web page optimized for a mobile device, a large-screen device or a touch-screen device. The code may direct the browser to request a web page optimized for an operating system of the device (e.g., iOS, Android, Windows, etc.) The code may direct the browser to request a web page optimized for a particular browser, e.g., Internet Explorer, Safari, Chrome browser, Firefox, etc. Thus, the injected code can improve or optimize a user's experience by customizing web page content or source based on device/browser attributes.

The intermediary may incorporate code that affects an aspect of any one or more resources for the modified web page. By way of illustration, and not intended to be limiting in any way, a resource may include one or more of: hypertext markup language (HTML) content or object, an image, a cascading style sheet (CSS), a widget, a social media plug-in, an analytics agent, a pixel tag, a beacon, a trust seal or badge, a media file, a script and an advertisement.

The intermediary may incorporate code that adds or modifies a configuration for including advertising in the modified web page. The code may detect if advertising is already provided for in the requested web page. The code may remove advertising, e.g., to improve page load time, or to exclude advertising material that is not relevant to the user. The code may modify an existing configuration, e.g., changing an aspect ratio, size, shape, position, animation (e.g., transition effects in presenting an ad or switching ads) of an ad. The code may control timing or delaying of an ad relative to other elements of the page, or in response to a user event or a page load event. In certain embodiments, the code may include an ad by creating a configuration for the ad, or modifying an existing configuration. In this way, the code may be used to incorporate customized content that may be from a third party. The intermediary and/or the injected code may also facilitate impression matching and/or perform brokering with third parties like ad exchanges, ad networks and ad agencies. Accordingly, the code may improve user experience by (i) providing access to relevant and/or customized content, goods and services via intelligent injection/modification of ads, (ii) removing or limiting irrelevant ads, and/or (iii) affecting the presentation of ads based on device/browser attributes and/or particular events.

The intermediary may incorporate code that directs the client's browser to pre-fetch a resource to store in a local cache. The injected code may direct or request the browser to fetch or access a resource (e.g., image), in anticipation that the resource may be needed shortly. For example, the code may direct or request the browser to request and load a resource in a local cache (e.g., of the browser). This pre-fetch may be performed in advance so that any impact from the access, transfer and/or load times for the resource, which may impair page load duration, is minimized. One or more resources may be identified (e.g., via a customized configuration) for pre-fetching. Suitable resources for pre-fetch may include certain large images and widgets, a related web page, or resources originating from a server/database with a slower response. By performing the pre-fetch in advance or in parallel with other page processing activities, the user's experience may be improved with the enhanced performance in loading the web page.

The intermediary may incorporate code that incorporates a third-party widget or content into the modified web page. The injected code may be configured to include content relevant to a user or the requested web page, without reconfiguring the server or how it generates its web page. Widgets from partners, such as third party analytics, may be added to a web page so that a user's online activity (e.g., specific to that web page or across pages) may be tracked and/or analyzed to improve customization of content and/or advertising relevant to the user. Such customization can be performed in real time or introduced at a later, appropriate time. The code may also introduce popular social media widgets or plug-ins, for example, to encourage user interaction, interest and involvement in the web page. Certain trial widgets, features and/or content may be included on-the-fly via the intermediary and/or injected code. For example, trial or limited rollout of a feature may be targeted to specific users, time periods, geographical areas, etc., via dynamic web page modification using the present systems and methods, without reconfiguring the end server. In some cases, third party provided content or widgets may be more securely introduced at a cloud service or intermediary, instead of being integrated with requested the web page at the server.

The intermediary may incorporate code that controls a location of a resource in the modified web page. The injected code may identify and detect particular resources that are less relevant or which may take longer to load. The injected code may identify and detect particular resources that are more relevant or may be faster to load. The injected code may control the layout of content and other resources by modifying a location of a resource in the web page. For example, the code may control a location of a resource relative to that of another resource. A resource may be re-located to the end of a web page so that it has more time to load, e.g., before the user scrolls to the end of the page. The code may re-position a resource to highlight the resource to a user, consolidate similar resources within a portion of the page, or to improve the layout of the page to the user.

The intermediary may incorporate code that controls a time instant for loading a resource to the modified web page. The injected code may initiate pre-fetching or caching of the resource to control the time instant for loading a resource. The code may delay or time the loading of a resource, e.g., relative to the request for the web page, or relative to a DOM, user or page load event. The code may replace or modify an existing deferring or blocking script. The injected code may comprise an asynchronous loading code. The latter may speed up page loads by allowing asynchronous execution. The latter may prevent a page for being held up trying to load a resource if for example, a third party site goes down or is slow. In some embodiments, the injected code controls a time instant for loading a resource into or from a local cache. For example, the code may direct a browser to load a resource onto a page, but keep the resource in the background (e.g., without making the resource visible or active). In certain embodiments, the injected code may control a time instant for loading a resource relative to a DOM, page load or user event, e.g., a click, a mouse-over, contact with a touchpad, a key entry, eye movement, scrolling action, etc. The injected code may control a time instant for loading a resource, e.g., an image or widget, when DOM is ready, or when the resource's location is in viewport.

In some embodiments, the intermediary incorporates code that determines a loading sequence for a plurality of resources. As discussed earlier, the injected code can determine a time instance and/or a position for loading a resource. The injected code can determine a time instance and/or a position for loading a resource relative to another resource or to other resources. For example, the code can control a loading sequence for a slideshow function. The intermediary and/or the code may be able to identify or detect a larger image or other resource that should be loaded earlier (e.g., pre-fetched), or delayed (e.g., to avoid a bottleneck in page load). The intermediary and/or the code may incorporate or comprise an algorithm to select and/or order resources for sequential and/or parallel loading.

The intermediary may incorporate code that controls a time instant for making a resource visible or not visible to the user. The injected code may control the time instant(s) and/or duration of a resource's visibility, transparency or alpha-blending with other elements, when loaded on a web page. The injected code may control the time and duration of transitioning effects (e.g., fade-in, fade-out) in making a resource visible or not visible to a user. The injected code may make a resource loaded in the background visible at a certain time or after a certain delay relative to a DOM or user event. The intermediary may incorporate code that triggers loading or visibility of a resource based on an action by the user, e.g., a click, a mouse-over, contact with a touchpad, a key entry, eye movement, scrolling action, etc. The injected code may control a time instant for making a resource visible or not visible relative to the visibility of another resource. The injected code may control a time instant for making a group or collection of resources visible or not visible to the user. In certain embodiments, the intermediary may incorporate code that triggers loading or visibility of a resource based on a web page loading event. The injected code may control a time instant for making a resource, e.g., an image or widget, visible when DOM is ready, or when the resource's location is in viewport.

Different portions or combinations of code may be injected based on existing features, and customizable based on particular requirements. Different portions or combinations of code may be injected on-the-fly to one or more fragments, while a request for a web page is processed. On-the-page processing occurs as the individual fragments are loaded onto a browser. Accordingly, the present systems and method provide a platform for dynamically modifying aspects of a requested web page that improve user experience.

C. Governing Client-Side Services

Described herein are systems and methods for governing client-side services. Such services can include resources that can be integrated into and/or used by applications, e.g., client applications or web applications. Some services are sometimes referred to as third-party and/or client-side services, and can be in the form of pixels, tags, beacons, plugins, agents, widgets, etc. The services can utilize one or more mechanisms to bootstrap their functionality to a web/client application, including but not limited to: HTML standards, JavaScript invocation, tag managers, for instance. Once bootstrapped, a service can be completely left up to its own code to handle the loading of further resources and/or modification of the web/client application. Because the service's code operates outside of the control of the web/client application's server, there is no ability to control such a third party service once its code is loaded into the web/client application. This can present a serious gap in monitoring and/or controlling operations of the service, e.g., when an anomaly or delay arises from the operation of the service. For instance, there can be challenges in managing service level agreements (SLAs), ensuring compliance to standards, addressing detected changes as well as detrimental effects on the performance of a corresponding web/client application.

Embodiments of the systems and methods described herein can be used to govern or manage client-side services, and can address or overcome challenges of integrating client-side services into client/web applications. The present systems and method can incorporate the use of an intermediary operating between one or more client devices and at least one server of the client/web application. The intermediary can collect metadata from the one or more client devices, and can monitor for anomalies in the operations of one or more services according to the metadata. The intermediary can include a metadata processor to control an operation of a particular service according to a detected anomaly, by for instance delaying, removing or modifying an operation and/or component of the service associated with the detected anomaly. The intermediary can control the operation of a particular service, by controlling instances of the service at one more client devices.

By way of example, services can include pixel tags, social media plugins, images, analytics trackers or agents, media files, widgets, and trust shields or badges. These services can be provided or operated by third parties (e.g., other than the user or developer of a host application), using or communicating with third party servers for example, instead of servers for the web/client applications to which the services are bootstrapped or incorporated. Examples of services can include: a VeriSign logo, Google analytics agents or tags, Hubspot plugins, and Marketo agents. The services can include third party widgets (e.g., from Facebook, Twitter and Pinterest). Categories of third party widgets include at least the following: (i) widgets for Facebook, Twitter, Pinterest, Google+, Add this, etc.; (ii) badges, logos or trust shields, for example, from VeriSign; (iii) Ads, for example, resulting from Google ad words; and (iv) beacons or agents, for example, from Google Analytics, Marketo, etc.

In accordance with some embodiments of the inventive concepts disclosed herein, an intermediary can detect a service (e.g., a widget integrated onto a web page) via an agent executing on the client device. The intermediary can for instance incorporate or inject code for the agent into a web page/application to be rendered on a client device. The code can execute on the client device and operate as an agent of the intermediary to collect and/or generate metadata associated with services, and to convey the metadata to the intermediary.

Figure 3A:
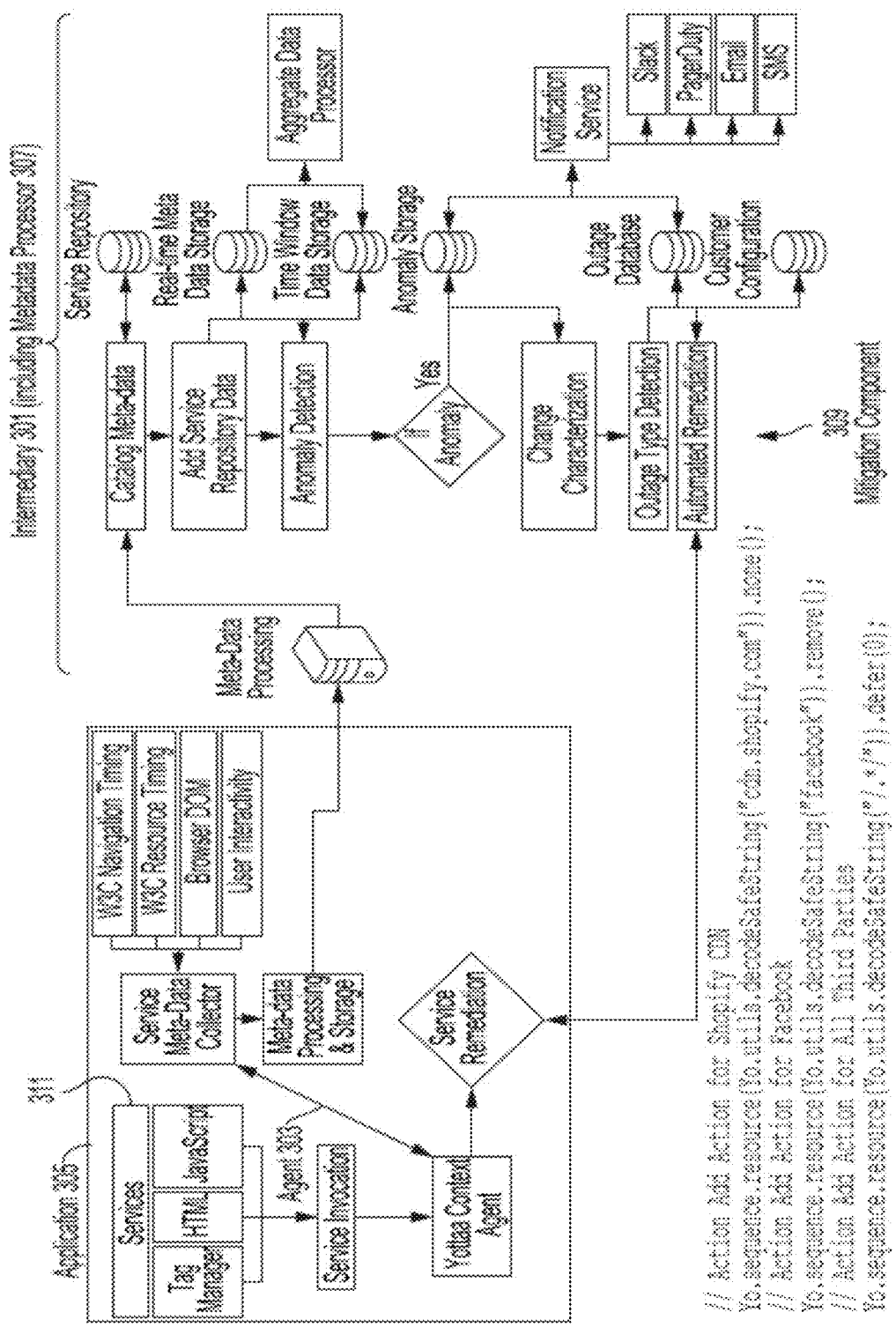
FIG. 3A is a block diagram of an embodiment of a system for managing client-side services.

Referring to FIG. 3A, one embodiment of a system for managing client-side services is depicted. In brief overview, the system may include an intermediary 301, an application 305 on a client, an agent 303 executing on the client, and/or one or more services 311 integrated with the application 305. Each of the above-mentioned elements or entities (and others disclosed herein) is implemented in hardware, or a combination of hardware and software. For instance, some of these elements or entities can include any application, program, library, script, task, service, process or any type and form of executable instructions executing on hardware of the system (e.g., intermediary and/or client). The hardware includes circuitry such as one or more processors, memory devices, connections or bus structures, and/or communication interfaces, in one or more embodiments.

The application 305 can include a client application, such as a software or program installed or loaded on a client device 102, or being installed or loaded on the client device 102. The application 305 can include a web application and/or a web browser. A web application can include a web page or online interface incorporating HTML, XML and/or other code that is being loaded on the client 102 using a web browser for instance. In some embodiments, the application 305 refers to a web browser executing on the client 102, such as Chrome, Firefox or Internet Explorer. More than one application can execute or be loaded onto the client 102. Each application can incorporate or instantiate one or more services 311 (e.g., third-party or client-side services or resources), via pixels, tags, beacons, plugins, agents, widgets, etc. As shown in FIG. 3A, the services can bootstrap, provide or incorporate their functionality to a web/client application using one or more mechanisms, including but not limited to: HTML standards, JavaScript invocation, tag managers, for instance. The services can include services based on a service-oriented architecture (SOA), including backend services supporting credit card or payment systems for instance. An instance of the service (sometimes simply referred to as a "service") on the client device can be invoked via one of such mechanisms, which can be detected by an agent 303. The agent 303 (sometimes referred to a Rapid agent, content agent or Yottaa content agent) can monitor, detect or listen to such mechanisms to detect the presence of (and/or to identify) an instance of a service 311.

The client 102 can execute the agent 303. The agent 303 can be activated by the application 305, a browser and/or an event (e.g., service loading event) of the application. The agent 303 can include any script, code or program executing on the client 102. For instance, the agent 303 can include or correspond to code injected or incorporated into a web page by the intermediary, as described in at least FIGS. 2A-2C for example. In some embodiments, the agent 303 can be incorporated or introduced into the application 305, e.g., by a developer of the application 305. For example, the agent 303 can be incorporated or introduced into the application 305 via a URL or link embedded into or referenced via the code of the application 305. In certain embodiments, the agent 303 can be incorporated or introduced into a web browser that is separate from or independent of the application 305. In some embodiments, the agent 303 can execute on the client 102, separate from or independent of the application 305 and/or a web browser of the client 102.

The agent 303 can include a service metadata collector. The agent can automatically and/or dynamically access, intercept, retrieve, request for, or otherwise obtain metadata regarding one or more services 311, from the application(s) 305 for example. The agent can detect and/or collect metadata in real-time. For example, the agent can capture information (e.g., metadata) from the client (or application and/or browser) during runtime. The agent can determine or collect metadata from information generated, formatted or stored according to W3C standards for example. Such information can be maintained or provided by the application 305 (e.g., client application, web browser). For instance, the agent can detect or monitor for a JavaScript or tag call from the application or client relating to a service (e.g., when a user triggers a JavaScript or tag), and can monitor or track requests relating to the service (e.g., requests to load components, data or resources of a service). A number of executing agents can monitor, collect or capture metadata about such requests across various applications and/or clients, concurrently and/or independent of each other. This metadata pertains to the services, which is in contrast with webpage or website visitor information collected by Google analytics for instance. The metadata can include information that is anonymized, or not personalized. The metadata pertaining to requests can include for instance: counts (e.g., number of requests, over a period of time, or per service instance for example); URLs in the requests; timing of the requests; start times of the requests; content of the requests and/or the corresponding responses; prioritization or sequencing of the requests; and/or call stack or invocation path of a request.

The agent can capture or collect metadata about presence of user interface (UI) aspects or element, triggered or established by a service. For example, the metadata can include: size and/or shape of a UI element, placement or location of the UI element, timing, level of interactivity and/or complexity of the UI element. As an example, a customer review tag can establish a UI for soliciting and/or receiving customer reviews, and the placement of the UI can be prominent (e.g., occupy a large area, and/or at a top portion of a web page).

The agent can capture or collect metadata about user interactivity (or interaction) with the service. For example, the agent can detect or track UI events, such as a user click (e.g., on a "like" button of a Facebook tag), selection, hovering over a specific region, and so on. The agent can monitor, detect and/or track (e.g., temporally or otherwise) levels, types, trends, patterns and/or statistics of user interactivity or interaction with the third-party service. The agent can monitor, detect and/or track interactions or interactivity initiated or triggered by the user and/or the third-party service. The agent and/or the intermediary (e.g., metadata processor) can generate, calculate, determine or otherwise output one or more metrics (e.g., as metadata) regarding the user track interactions or interactivity with a third party service. The agent can detect or track modifications in UI features of the service, such as the service's introduction of a chat button at certain times or triggered by a certain event.

The agent can detect errors, and can capture or collect metadata about such errors. The agent can capture or collect metadata about request failures, JavaScript errors, HTML errors, and so on. The agent can capture or collect metadata about raw or code execution errors on the web browser of the client 102 for example. The agent can send or convey the metadata to the intermediary, e.g., in real-time or in batches (e.g., according to a particular interval, schedule or event).

The intermediary 301 can include one or more network devices or servers, such as a collection of cloud computing resources, and can include elements of the intermediary 211 described above in connection with at least FIGS. 2A-2B. The intermediary 301 can reside and/or operate between at least one client 102 and at least one server 106 (e.g., web server), for instance as shown in FIGS. 2A-2B. The intermediary can include a metadata processor 307 to process the metadata collected and provided by the agent. In various embodiments, the intermediary 301 itself or some element/feature of the intermediary (e.g., metadata processor 307) can reside on or be part of the client 102 and/or the at least one server 106, or can correspond to a device or network node separate from the client 102 and/or the at least one server 106.

The metadata processor can process the metadata (collected across one or more agents, services, applications, clients and/or users) in one or more of the following ways or steps. The metadata processor can catalog or categorize the metadata using information maintained in a service repository. The metadata processor can match service meta-data against information maintained in the service repository (e.g., a library of known client-side services). The metadata processor can identify or register a service corresponding to the cataloged metadata. FIG. 3B provides an illustration of a dashboard or overview of known third-party services and some metadata about the services. The dashboard or overview of services can be for a particular website or server of an application that incorporates or uses the services. The dashboard or overview can include an identification of each service, a category or type of the respective service, an indication that the service is provided by an external system (e.g., a third-party server), a number of violations occurring for the service per one thousand (1K) web/HTML pages that incorporate the service, and/or the date on which the respective service is first discovered, detected or categorized by the system.

Figure 3C:
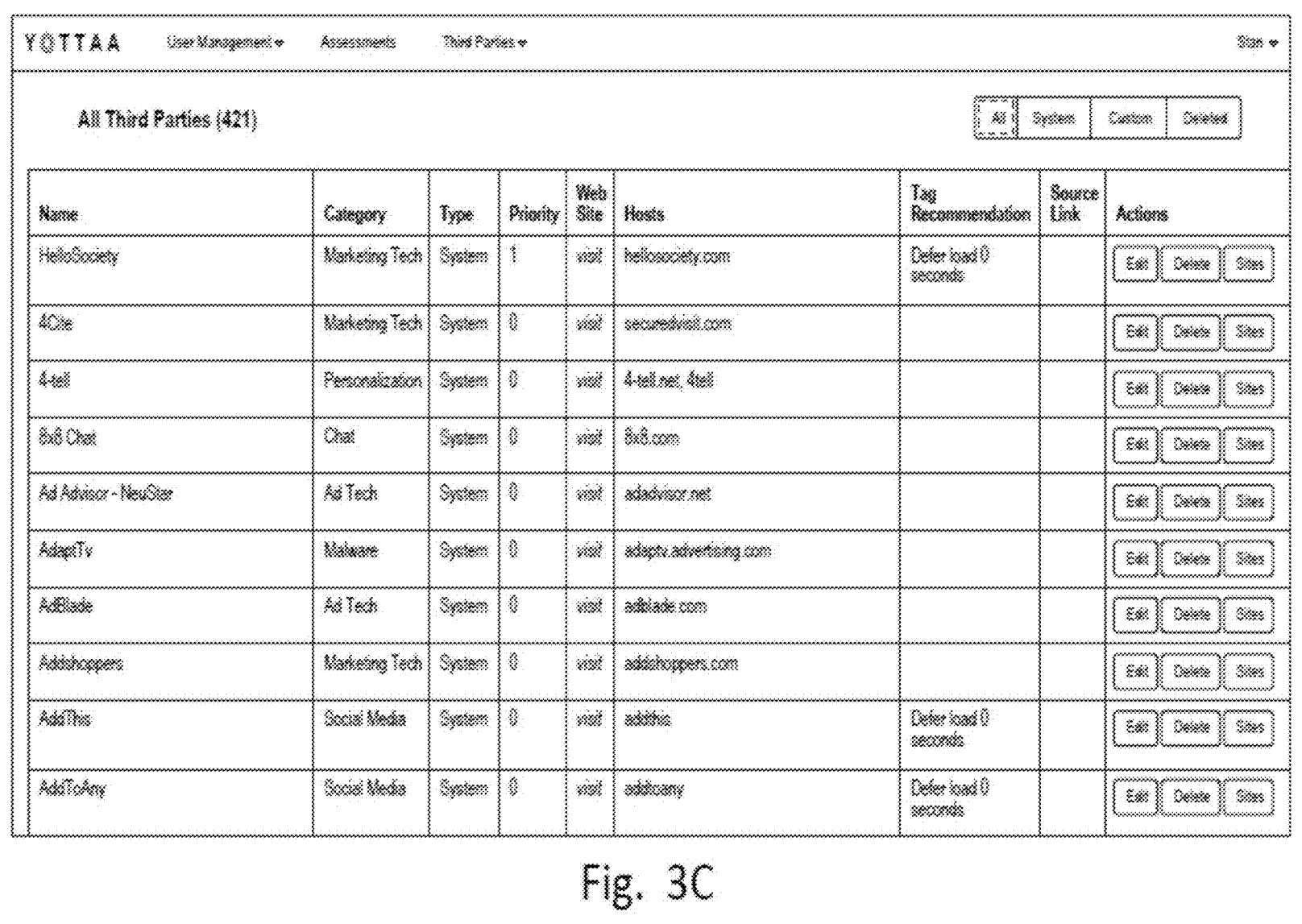
Figure 3D:
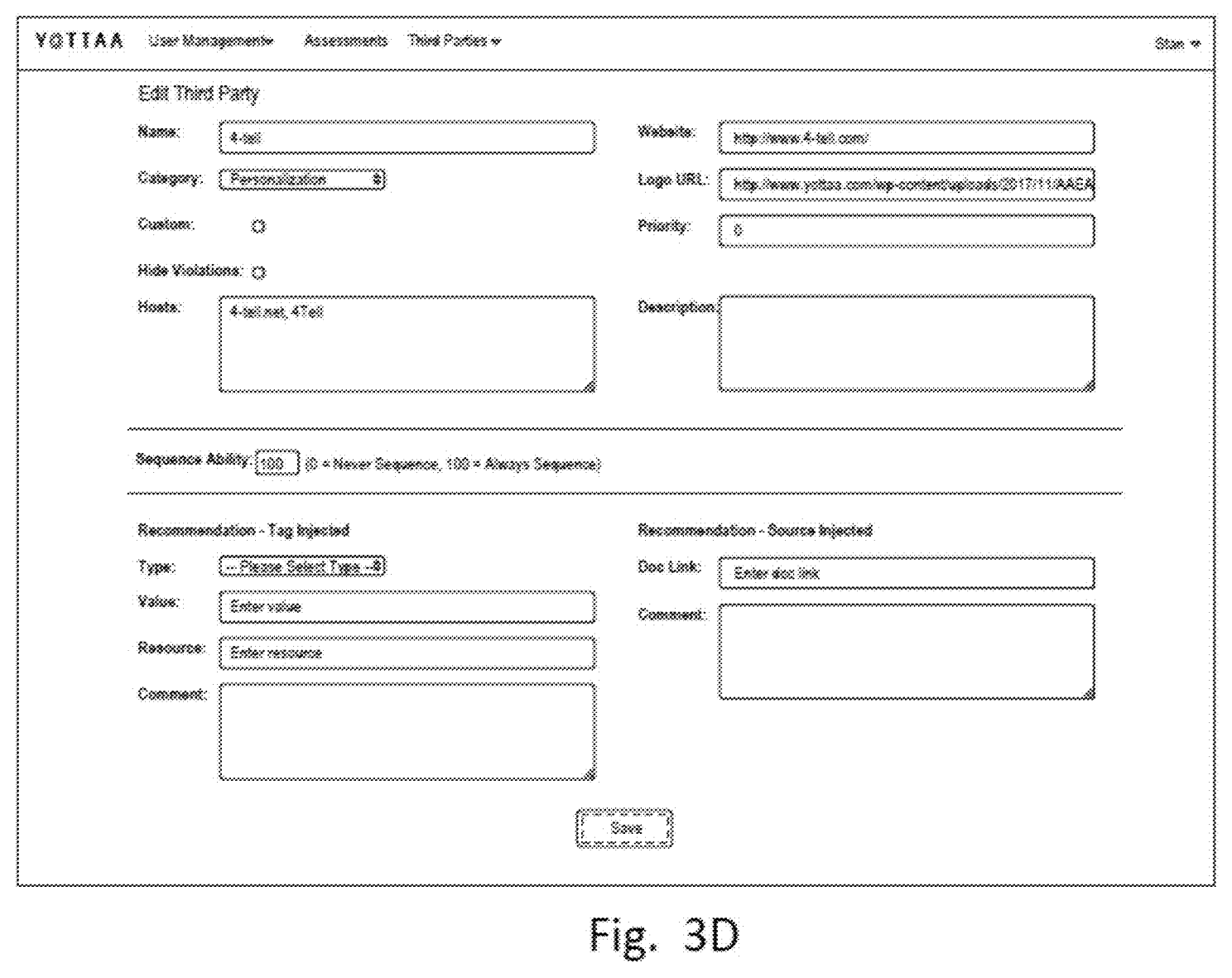

The metadata processor can store or maintain any of the processed metadata about a particular service into the service repository. The metadata processor can update the service repository with any of the processed metadata about a particular service. The service repository can comprise an inventory or record of one or more services. FIG. 3C provides an illustration of information about third-party services maintained in a service repository. The information can include an identification or name of each service, and a type, category, priority and/or host server of the respective service. By way of an example embodiment, FIG. 3C provides the information in a user interface that allows a user to manually input information about a service and/or to manage the repository of services (e.g., add, edit or delete a record for a certain service). The user interface can provide a recommendation for handling a tag corresponding to the service. In addition to or instead of the user interface, the intermediary can provide an application programming interface (API) for managing the repository of services. FIG. 3D shows an example embodiment of a management screen UI for managing a specific service of the repository. The management screen UI can be used to edit aspects of a service.

The metadata processor can automatically catalog metadata or information about unknown services. The metadata processor can automatically build an inventory of services using collected metadata about services. The metadata processor can detect changes in services utilized by a particular application (e.g., addition or subtraction of a service). The metadata processor can perform sub-categorization of the metadata, service or request, into one or more sub-categories according to its bootstrap mechanism, configuration type, type or level of UI modification or document object model (DOM) modification, and/or type of analytics collected or performed by a service. The agent can relate an anomaly to such a sub-category, to identify a source or cause of the anomaly for example. The metadata processor can track or determine service usage, e.g., how much a service is used across applications and/or users. The metadata processor can track or determine an amount, pattern or trend of an application's usage of a service. The metadata processor can track or determine a usage amount, pattern or trend of a visitor/user's usage of a service. The metadata processor can track or detect service errors, for example the type and/or severity of errors, the number and/or frequency of errors, and so on.

The metadata processor can perform anomaly detection for service information included in the metadata, or derived from processing the metadata. For instance, the metadata processor can form historical data in the form of a time series using the metadata, by processing and organizing the metadata into time windows and/or aggregating metadata for instance. The historical data or time series can include performance data about a service (e.g., request count, request timing and so on). The metadata processor can compare or match real-time metadata with aggregated sets of performance data (e.g., patterns in the time series), to detect potential anomalies. The comparing or matching can be performed using manual inspection (e.g., by a user), and/or via machine learning. The aggregated sets of performance data can be in the form of mean and/or standard deviation values (e.g., based on a normal distribution of values). The metadata processor can detect an anomaly by performing outlier detection using the time series. The outliner detection can be a comparison of real-time metadata values relative to a standard deviation (e.g., sigma value) and/or mean value from the time series. The mean value can be a mean or average value of a particular aspect (e.g., request count, request timing, number of errors or violations, and so on), over a certain range or period of time. The outliner detection can include a determination of whether a data-point or value from real-time metadata is within or outside a multiple of the standard deviation (e.g., N-sigma, wherein N can be 1 or higher, and is a multiplication factor for the value of sigma), relative to a corresponding mean value for example.

Figure 3E:
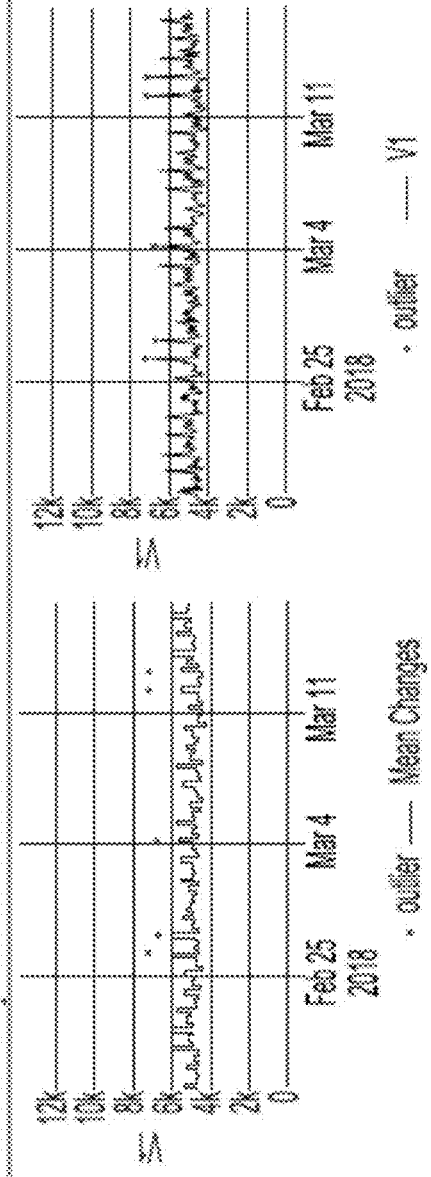
FIG. 3E illustrates a time series of number of violations detected for a service over a period of time.

For example, FIG. 3E illustrates a time series of the number of violations detected for a service over a number of days, e.g., as indicated by the fluctuations in value that include a number of spikes in value. The time series can include mean values according to historical service data, which are determined and super-imposed onto the time series, as indicated by the flat-top and flat-bottom values. The metadata processor can identify outliers as performance data or metric(s) (from real-time metadata) that deviates from a corresponding mean value by at least a certain amount (e.g., by twice the value of sigma, for 2-sigma). Such outliers are illustrated as circular dots corresponding to some of the peaks. The metadata processor can identify an anomaly according to one or more of such outliers.

The metadata processor can detect a change triggered by or associated with a service, such as a change that cannot be (or cannot be readily) quantified in numerical values. Such a change can include an error condition such as a JavaScript error. Such changes can include a change in UI associated with a service. For instance, the metadata processor can detect that a UI has been modified abnormally (e.g., to occupy a disproportionate portion of a page or display, to support no interactivity, and so on), or that an expected UI feature, URL or content is not present. As another example, the metadata processor can detect that a known content or component has an inconsistent or unexpected size or hash value when downloaded or under compression. Further examples of anomalies, errors or detected changes can include slow execution of JavaScript, delay in loading a component for a service, and excessive consumption of resources (e.g., bandwidth, computational effort) to support or load a service.

The metadata processor can perform root-cause analysis for an anomaly, error or detected change. The metadata processor can determine if the cause or trigger of the anomaly, error or detected change arose from a particular service, what request of the service (e.g., a request to install a widget), a certain function of a service (e.g., UI function for user input), a certain line of code (e.g., JavaScript or HTML), a certain column of code or content, etc.

The metadata processor can characterize or classify any of such detected occurrence (e.g., anomaly, error or change) for the purpose of further processing or remediation. For instance, the metadata processor can characterize or classify a detected occurrence as a service outage, a performance degradation, or an error, which can be further characterized as being behavioral blocking (e.g., a UI feature of a user-review system becomes non-usable by a user) or non-impacting (e.g., an artifact is displayed in an unimportant region of a display or page). For instance, if a detected change is non-impacting (e.g., does not affect the application and is limited to a certain service being inactive), the system can ignore it, while if the detected change is behavioral blocking (e.g., which blocks a user from performing a transaction) the system can attempt to remove an operation or component of a service that is causing the detected change.

For a service outage, the metadata processor can detect the type of outage, to establish a context for the anomaly. Such contextual awareness can be applied towards intelligently mitigating or addressing such outages within an identified context (e.g., instead of in other contexts or across all contexts). For example, the metadata processor can determine if an outage occurred for, or is specific to a particular user or visitor of a web application or page, or is specific to a particular type, class or group of users or visitors (e.g., in order to determine the relevant context). The latter can pertain to particular user or visitor demographics, such a certain GEO demographic, or the use of a device type, browser type, browser version, etc. The context of a service outage can relate to visiting a particular page of a website, to the entire website, or to all websites. The context of the outage can relate to users from a particular community and/or region, or to all communities and/or regions. The context of an outage can relate to the state of the outage, e.g., that the outage has started, is continuing, or has been resolved. By identifying particular context(s) within which an anomaly can happen, the system can perform remediation targeted to or focused on the identified context(s).

The system can include a mitigation component 309 for performing remediation of issues pertaining to the detected anomalies, changes or errors. The remediation or mitigation process can include preventing certain operation(s) of a service, modification of the service, delaying an operation or loading of a service, or removal of certain aspects (e.g., operations, components) of the service. The remediation or mitigation process can override certain user/customer configurations, e.g., to address certain types of outages or errors for instance. The remediation or mitigation process can be automated or automatic, e.g., configured to proceed according to user-specified remediation parameters. Such remediation parameters can relate to the type or context of an outage, such as specific visitor(s) and specific visitor demographics as discussed earlier. For example, if a service utilized within a GEO region (e.g., Europe) is prone or susceptible to outage, the mitigation component 309 can target that GEO region for remediation or preventive action. If a user from a susceptible group is detected to have an issue with a certain service, the mitigation component can preemptively remove the service from other users in the group for example, prior to the issue occurring with these other users.

In some embodiments, a remediation parameter can specify a duration for an anomaly (e.g., an outage). For example, a duration can be specified for the length of an outage, after which a remediation or mitigation step can be activated by the mitigation component on other instances of the service utilized in other clients. A remediation parameter can specify to trigger a remediation or mitigation step according to a state of an anomaly. For example, the mitigation component may determine for wait for another 10 minutes before taking action, if a JavaScript of the relevant service has already executed up to a certain state. One remediation parameter can specify that if a service is detected to be causing a degradation in a certain functionality (e.g., in business and visitor analytics, which may be provided by another service or application), the mitigation component should activate its remediation process.

The mitigation component can (e.g., automatically) perform a change in a customer's application configuration, for example to remove or defer an operation or component of a service associated with an anomaly. The mitigation component can remove the mitigation or remediation process (e.g., allow a service to operate or resume), after an outage is resolved. The mitigation component can provide notifications about a detected anomaly, for instance to alert or update users about the issue and/or the state of the issue.

If a certain group of users or type of user is known or monitored (e.g., by the metadata processor) to have certain metric(s) regarding user interaction with respect to a particular service (e.g., a low interactivity or usage metric, or zero usage by a user), the mitigation component can decide to avoid, or not to load and/or activate the service for the user and/or other users in the group (e.g., in particular computing environment(s)), or can decide to load and/or activate the service later or at a lower priority than at least another service.

In some embodiments, the metadata processor can perform correlation of metadata to visitor and/or business analytics. The metadata processor can have an API for obtaining visitor and/or business analytics from sources, or can process metadata to generate its own analytics. Business analytics can include information about conversions, events, revenue, order values and so on. Visitor analytics can include visitor information (profile, GEO, etc.), bounce rate, number of pages visited per visitor, session duration, as examples. For example, the metadata processor can collect visitor information from third party services or sources, such as Google Analytics, Omniture, Core Metrics, etc. The metadata processor can store the obtained or collected analytics in a repository that is local or accessible to the intermediary for example. The metadata processor can perform correlation of visitor and/or business analytics to one or more of: an inventory of services, types of detected errors, types of outages, durations of outages, etc. The metadata processor can use the analytics with the collected metadata to detect real-world issues.

Figure 3F:
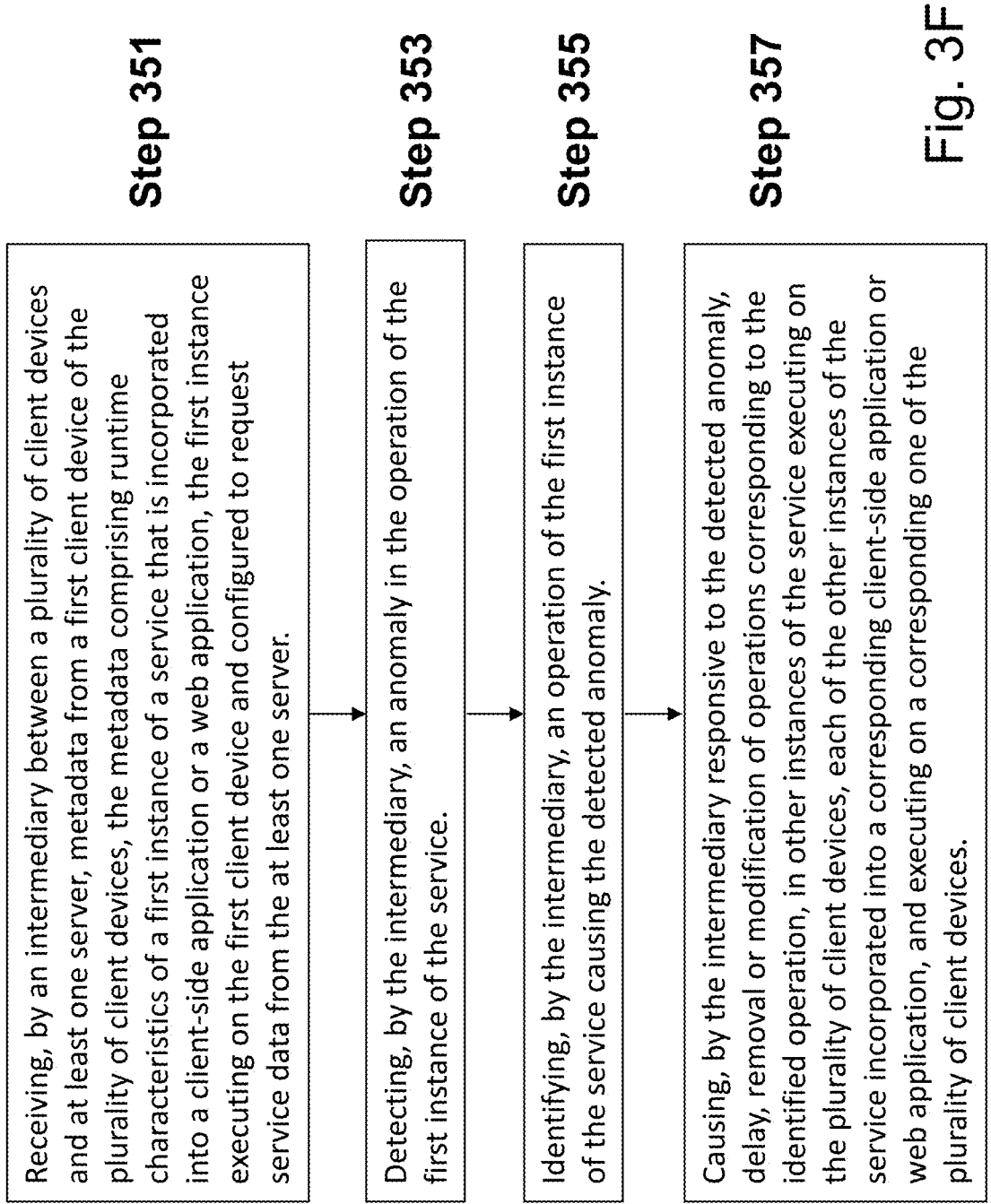
FIG. 3F depicts one embodiment of a method for managing client-side services.

Referring now to FIG. 3F, one embodiment of a method for managing client-side services is depicted. The method may include receiving, by an intermediary between a plurality of client devices and at least one server, metadata from a first client device of the plurality of client devices (351). The metadata can include runtime characteristics of a first instance of a service that is incorporated into a client-side application or a web application, the first instance executing on the first client device and configured to request service data from the at least one server. The intermediary can detect an anomaly in the operation of the first instance of the service (353). The intermediary may identify an operation of the first instance of the service causing the detected anomaly (355). The intermediary may, responsive to the detected anomaly, cause delay, removal or modification of operations corresponding to the identified operation, in other instances of the service executing on the plurality of client devices (357). Each of the other instances of the service can be incorporated into a corresponding client-side application or web application, and execute on a corresponding one of the plurality of client devices.

D. Orchestration Using Predictive Service Congestion Control

Described herein are systems and methods for orchestration using predictive service congestion control. The present systems and methods can incorporate the use of an intermediary operating between one or more client devices and at least one server of the client/web application, which collects metadata from the one or more client devices pertaining to the loading, use and/or operation of services incorporated into various web and client applications on the one or more client devices. The intermediary can include a configuration engine to generate and provide a configuration to an agent executing on one of the client devices, for use in managing loading of services from the at least one server onto the web application or client-side application. The configuration can for example include information about an expected amount of bandwidth to be utilized for loading a corresponding service from the at least one server onto the web application or client-side application, and a loading priority for the service. The agent can determine bandwidth and/or other resources available to the client device, and use this information with the configuration to control the loading of services in a particular order or sequence. The present solution is in contrast to using a browser, operating system and/or network for handling congestion control in loading webpages (or application data/content/elements) onto client devices, which is often ineffective or sub-optimal as none of these components know much if anything about services that are to be requested.

As discussed in this disclosure, services can include pixel tags, social media plugins, images, analytics trackers or agents, media files, widgets, and trust shields or badges, as examples. A client-side application executing on a client device can incorporate a number of services (e.g., via HTML or other code), and the loading of the services can result in congestion or inefficiencies in loading these services onto the client device. Various services can require or use different amounts and/or types of resources to load. Various services may also be utilized differently on the client-side application, and can be prioritized according to historical data available to the intermediary for example. Such information (service definitions or characteristics) can be shared or conveyed by the intermediary to the client device. Thus, the intermediary can interoperate with or cause the agent to perform congestion control of webpage or other service-related data/content loading onto a client device.

Figure 4A:
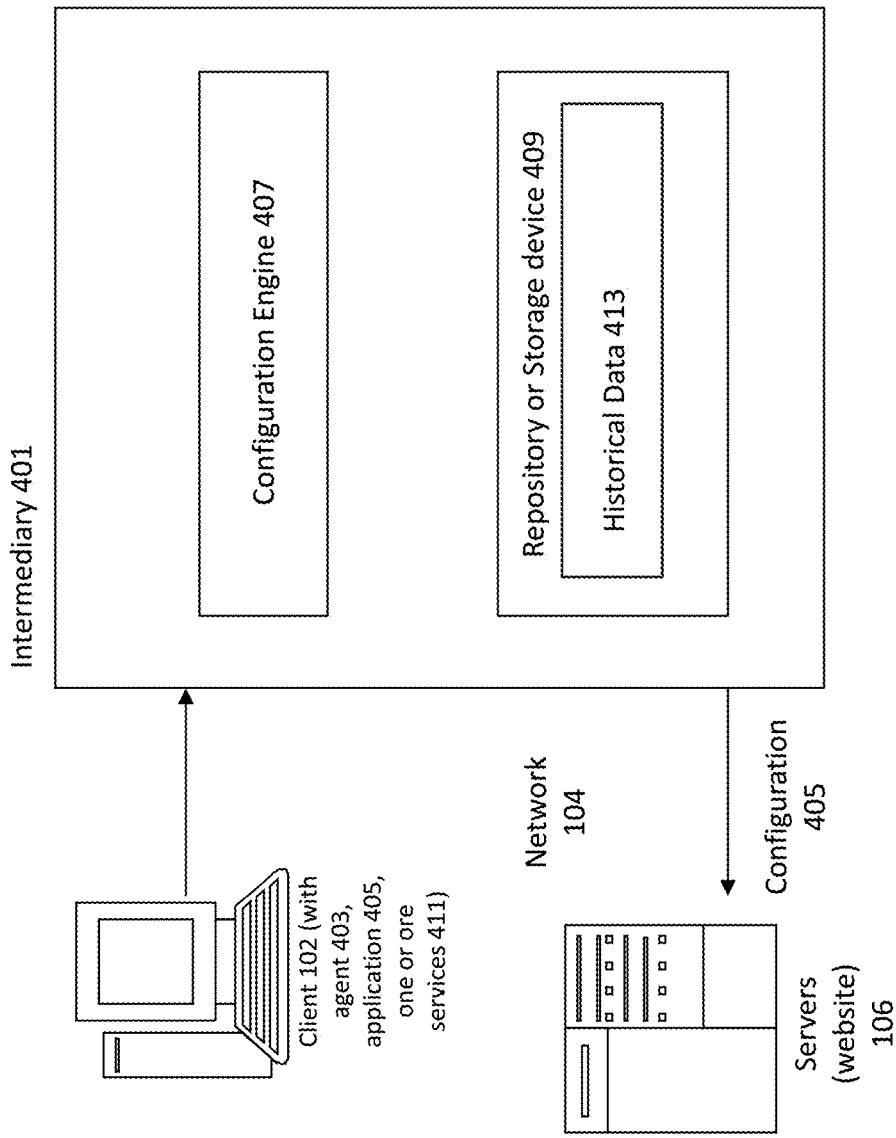
FIG. 4A is a block diagram of an embodiment of a system for managing client-side services.

Referring to FIG. 4A, one embodiment of a system for managing client-side services is depicted. In brief overview, the system may include an intermediary 401, an application 405 on a client 102, an agent 303 executing on the client 102, and/or one or more services 411 integrated with the application 405. Each of the above-mentioned elements or entities (and others disclosed herein) is implemented in hardware, or a combination of hardware and software. For instance, some of these elements or entities can include any application, program, library, script, task, service, process or any type and form of executable instructions executing on hardware of the system (e.g., intermediary and/or client). The hardware includes circuitry such as one or more processors, memory devices, connections or bus structures, and/or communication interfaces, in one or more embodiments.

The application 405 can include a client application, such as a software or program installed or loaded on a client device 102, or being installed or loaded on the client device 102. The application 305 can include a web application and/or a web browser. The application 405 can include any embodiment of one or more features of the application 304 as described above in connection with at least FIG. 3A. Each application 405 can incorporate or instantiate one or more services 311 (e.g., third-party or client-side services), via pixels, tags, beacons, plugins, agents, widgets, etc. The services 411 can bootstrap to a web/client application using one or more mechanisms, including but not limited to: HTML standards, JavaScript invocation, tag managers, for instance. Each of the services 411 can include any embodiment of one or more features of the service 311 as described above in connection with at least FIG. 3A.

An agent 403 can execute on the client 102. For example, the agent can include code or a program transmitted to the client for execution, or incorporated into a client/web application for execution on the client. The agent 403 can be activated by the application 405, a browser and/or an event (e.g., service loading event) of the application. The agent 403 can include any embodiment of one or more features of the agent 303 as described above in connection with at least FIG. 3A. The agent can send a request to the intermediary 401, for a configuration to be used in managing loading of services from one or more servers 106 onto the web application or client application 405.

The intermediary 401 can include one or more network devices or servers, such as a collection of cloud computing resources, and can include any embodiment of elements of the intermediary 211 or 301 described above in connection with at least FIGS. 2A-2B and 3A. The intermediary 401 can reside and/or operate between at least one client 102 and at least one server 106 (e.g., web server), for instance as shown in FIG. 4A. The intermediary can include a configuration engine 407 to generate and provide the configuration 405.

As discussed above in connection with at least FIGS. 3A-3F, the intermediary can receive, process and/or store metadata associated with services operating across one or more client devices 102. The intermediary can build and maintain a repository of services, including characteristics or metadata of the corresponding services. The intermediary can store or maintain the repository of services, and/or various information and analytics obtained by the intermediary (e.g., via its metadata processor), into one or more data storage devices as illustrated in FIG. 3A for instance. The intermediary can monitor, track and/or maintain any of the metadata, service categorization(s), service usage information, service errors, and/or anomalies (e.g., service outage, error or detected change), as described above in connection with FIGS. 3A-3F for example. In various embodiments, the intermediary, or some element/feature of the intermediary (e.g., metadata processor) can reside on or be part of the client 102 and/or the at least one server 106, or can correspond to a device or network node separate from the client 102 and/or the at least one server 106.

The intermediary can build or accumulate knowledge about specific service(s). The intermediary can do so via processing and analyzing metadata and/or other information discussed herein, and/or by receiving user input about the service(s). For example, the intermediary can obtain and maintain information about service requests, bandwidth utilization, response time, and/or visitor usage (e.g., user interaction, interactivity, participation, involvement), by processing received metadata, and/or by receiving user configuration of services that are to be used in an application. The intermediary can track, analyze and store patterns of usage of particular service(s). The information or metadata about services can be organized or arranged into service definitions (or records), and stored in the service repository for instance. A service definition can include any aspects of a service described herein, including any of the types or embodiments of metadata described in section C for example.

By way of illustration, a service definition can include one or more of: a name or identifier of a service; a pattern of requests issued to load a service (which can be indicative of a loading pattern for service components/data/content, e.g., to provide a temporal indication of time and/or bandwidth utilized to load all requested elements of a service for example); a count or number of requests (e.g., a total number of requests for service components/data/content, to establish or provide a functionality of the service); bandwidth to support requests of a service (e.g., amounts of bandwidth in bytes for instance, and/or aggregated amount utilized to transfer or load service components/data/content onto a corresponding client), as examples. A service definition can include information about user interface (UI) features such as location of a UI provided by a service, or how fast the UI can load on the client (which can be indicative of how a service component would be used, or how the service component can impact the corresponding application, and can be used to prioritize the corresponding service). A service definition can include information about speed of loading a service (e.g., a fast/normal/aggressive classification, or an expected time for loading a service on an application, from first to last byte of the service for instance). A service definition can include information about loading progression and/or loading rate of components of a service, for example slow (e.g., with time duration gaps between requests), normal (e.g., evenly-spaced requests), or aggressive (e.g., single or multiple requests issued for immediate loading), as examples.

Figure 4B:
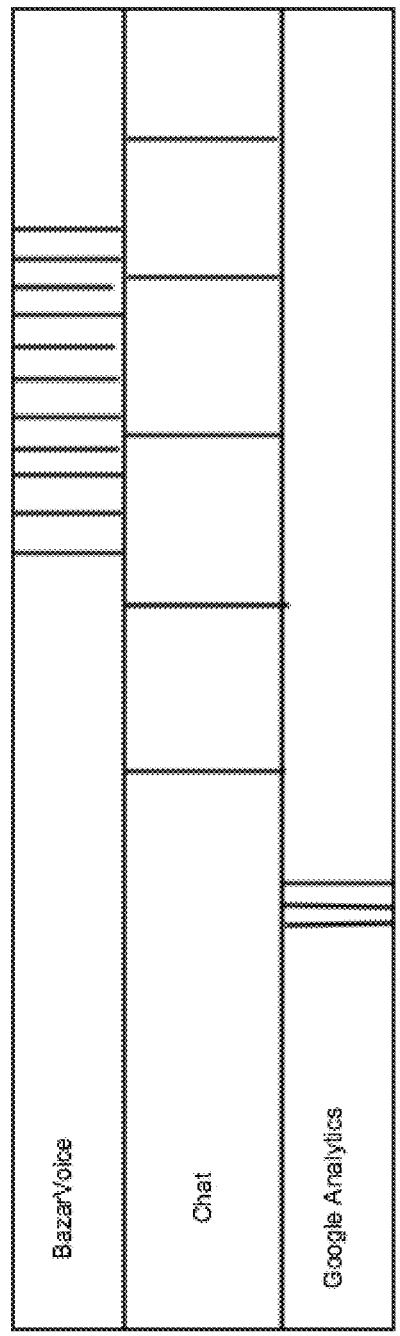
FIG. 4B are example representations of loading progression patterns of services.

By way of illustration, FIG. 4B shows examples of services and their respective loading progression pattern. The loading progression pattern can indicate time instances when service requests (e.g., represented by vertical lines) may occur along a timeline which includes the loading and execution of a host or underlying application. For instance, Bazarvoice, which may be a customer review system or service, can be characterized by a sequence of requests occurring after a defined period from the start of loading of a host web application. The sequence of requests may occur after some time after initial loading of the web application to facilitate customer reviews that usually do not occur immediately upon loading of the web application or web page. A chat service may be characterized by periodic requests initiated by a user's interaction with the web application. An analytics service, such as Google Analytics, may usually be loaded via a number of requests occurring proximate to the initial loading of the web application, in order to collect information during a significant portion of the web application's session.

In some embodiments, a service definition can include information or metric(s) about user interactivity or interaction (e.g., how and/or how much a user can interact with the service, if at all). For instance, because a chat service can involve interaction by a user, it may be given higher priority for loading (as compared to a service with a relatively lower priority for loading), and since Google Analytics would not involve user interactions with it, it may be given lower priority in some scenarios. The information about user interactivity can include information about: time (such as when a user may be expected to interact with the service), events (e.g., an event or situation that triggers user interaction, such as the rendering of the application immediately leading a user to click on a feature of the service), or user interface characteristics (e.g., a service's widget that is located prominently on a page can encourage user interaction with it). A service definition can include one or more custom settings, such as a custom or user-specified priority for a certain service, such that services with the highest priority (e.g., due to or involving higher levels of user interactions) should be loaded first. Part or all of each service definition can be automatically determined (e.g., by a metadata processor and/or configuration engine of the intermediary), be user-specified, or be determined by a combination of both.

The current systems and methods can determine how best to (or how to optimally or most efficiently) load services onto the client (e.g., on a webpage) according to the definitions of the services, e.g., to improve or optimize user experience and/or client device performance. The current systems and methods can determine how best to fit the requests of the services according to the definitions of the services. The current systems and methods can determine how best to order, sequence, prioritize and/or schedule the requests of the services (to be sent by the application to the browser for loading the services), according to the definitions of the services. In some embodiments, the intermediary generates and provides a configuration based on the definitions, to direct, influence orchestrate and/or manage the loading of the services. The intermediary can generate and provide the configuration responsive to receiving a request from the agent executing on the client. The request can be sent to the intermediary upon execution of the agent on the client, or upon the agent detecting a certain event (e.g., a user scrolling to a particular section of a web page). The agent may be introduced into the client (e.g., into a client or web application) for the purpose of managing or orchestrating the loading of services for the client or web application. The agent may be bootstrapped or incorporated near the start of a webpage, and configured to execute prior to loading of the services. In some embodiments, the loading of the services can operate in conjunction with, or independent of, the resource loading management/optimization operations described in section B for instance. For example, the agent may be part of (or be in addition to) the code injected into a web page fragment for execution on the client, and can perform application sequencing operations as described in section B, as well as to orchestrate the loading of services.

By way of a non-limiting example, the following is an illustrative representation of code that may be incorporated into code (e.g., HTML) of an application, to load JavaScript code (e.g., rapid.min.js) that includes code for the agent, as well as code for application sequencing:

```
<!-- Load the application sequencing Code -->
<script src="https://cdn.yottaa.com/rapid.min.js"></script>
<!-- Load the configuration from the servers/intermediary (configuration engine) -->
<script>Yo.configure('https://qoe-1.yottaa.net/api/v1/configure.rapid.js?key=SITE-KEY');</script>
```

The Yo-configure function call in the code can initiate a request to the intermediary (or configuration engine) for a configuration to help orchestrate the loading of services included or instantiated in the application. Responsive to receiving the request, the configuration engine can generate and send the configuration (e.g., in a HTTP response message) to the agent. As illustrated below, the configuration can include configuration settings (or definitions or metadata) of each service expected to be loaded:

```
Yo.orchestrate.service({name:'bazaarvoice', expectedRequestCount: 20, expectedBandwidth: 1000000, speed: 'slow', loadingProgression: 'medium', userInteraction: 'ui', priority: 0, loadTime: 5000});
Yo.orchestrate.service({name:'chat', expectedRequestCount: 'infinite', expectedBandwidth: 10000, speed: 'slow', loadingProgression: 'low', userInteraction: 'time', priority: 1000, loadTime: 300});
Yo.orchestrate.service({name:'googleanalytics', expectedRequestCount: 3, expectedBandwidth: 10000, speed: 'fast', loadingProgression: 'high', userInteraction: 'event', priority: 10000000, loadTime: 500});
Yo.orchestrate.bestfit(4000);
```

As illustrated, the configuration settings can include, for each service, a name or identification of the service, an expected request count, an expected bandwidth usage or requirement, an indication of loading speed, an expected loading progression type, an indication (or metric) of user interactivity with the service (if any), a priority, and/or an expected load time. The agent can rank or set the priority of For instance, the agent can include a function bandwidth( ) { } that returns a value between 0 and 100 for the bandwidth score.

By way of illustration, the code block below shows the loading of an example application. The code block includes some content for HTML, some resources for the application, the loading of a library to implement the agent, and a configuration call to request a configuration:

```
<!DOCTYPE html>
<html>
  <head>
    <meta charset="utf-8">
    <meta http-equiv="X-UA-Compatible" content="IE=edge">
    <meta name="msvalidate.01" content="A2AA63E27B1A62557CEF40C83C6DD528" />
    <title>Swimsuits, Polos, Jeans, Shorts, Skirts, Pants, Dresses</title>
        <!-- Coradiant Include -->
        <script language="javascript" type="text/javascript" src="/coradiant/coradiant.js"></script>
        <!-- End of Coradiant Include -->
    <meta name="description" content="">
    <meta name="viewport" content="width=device-width, initial-scale=1.0">
    <!-- START GlobalIncludes - Created on: Tue Apr 10 12:33:28 CDT 2018 -->
        <script type="text/javascript" src="script.js"></script>
        <link type="text/css" rel="stylesheet" href="styles.css"/>
        <!-- Yottaa Rapid -->
        <script src="https://cdn.yottaa.com/rapid.min.js"></script>
        <script>
Yo.configure('https://qoe-1.yottaa.net/api/v1/configure.rapid.js?key='+yoEnvKey);
        </script>
``` the service according to the numerical value of the priority setting (highest value has a highest priority).

In some embodiments, the configuration is generated dynamically using up-to-date information (e.g., metadata), responsive to a request for the configuration. In some embodiments, the configuration can be cached or stored at the client device for a defined period of time, and can be used to manage subsequent loading of services (e.g., triggered by a next loading event) if still within the defined period of time.

In some embodiments, the agent can determine, estimate and/or calculate one or more resources available to the client device, such as bandwidth, computational processing power, memory, storage capacity, audiovisual rendering or processing capability, and so on. For instance, the agent can determine at least some of the available resources by communicating with an operating system of the client, and/or by determining resources consumed by the agent, the application and/or other entities operating on the client.

Taking bandwidth of a client as an example, web browsers generally do not provide any measurement of bandwidth to webpages. However, the present solution can include an agent that can approximate the bandwidth of the client using measurements available to the client application, and manage loading of service based on an understanding of services, size and/or normal latency of the application. The agent can obtain or capture measurements of timing of an initial page load up to the point of the execution of agent, of a configuration retrieved from the intermediary, and of any resources loaded up to this point. The response to the agent's configuration call can provide loading information about the size of resources and normal latency of services for instance. The agent can use or combine information from these two sets of information, and the type of device (e.g., mobile, desktop, tablet), to determine a bandwidth score or value.

When the JavaScript code (in rapid.min.js) of the agent loads, the agent can capture timing information (e.g., start loading time) related to the resources loaded (e.g., HTML, script.js, stylesheet), and the time up to this point (e.g., current time).

The configuration provided by the intermediary for the agent can contain metadata about the resources for the application, such as sizes and latencies of the resources loaded up to the point the configuration is conveyed to the agent.

//Configuration sent from the server/intermediary can specify initial resources and loading information.
Yo.initial.loading(constantValue, {html: {size: 24000, latency: 400 ms}, resources: [{name: 'script.js', size: 100000, latency: '100 ms'}, {name: 'styles.css', size: 84000, latency: '60 ms'}]);

The agent can estimate an available bandwidth for the client using for example the timing information and the sizes of the resources loaded. The agent can apply the information from the Yo.initial.loading call and timing metrics for each resource (e.g., from the configuration) into a bandwidth function( ){ } to determine an available bandwidth for the client:

```
function bandwidth( ){
  var timeOfRapidClient = currentTime - startLoadingTime;
  var styleBandwidth = size/(expectedValue - actualValue);
  var scriptBandwidth = size/(expectedValue - actualValue);
  var htmlBandwidth = size/(expectedValue - actualValue);
  var bandwidthValue =
  (styleBandwidth+scriptBandwidth+htmlBandwidth)/constantValue;
  if (userAgent.contains('Mobile')){
```

```
        //Reduce bandwidth if mobile by 50%
        bandwidthValue = bandwidthValue * 0.5;
    }
    return bandwidthValue;
}
```

In some embodiments, the agent can adjust the bandwidth score according to a type of the client device. For instance, a mobile client device may have reduced performance if a large portion of its available bandwidth is utilized. The agent can accordingly reduce the bandwidth score or value by a defined amount, e.g., 50%. The agent can also set constraints on service loading in other ways. The agent can set a constraint to load services within a defined time window. For example, the agent can specify to only load text (and not multimedia content for instance) on a 2G client device, and/or to limit service loading time to 2 seconds for example. The agent can set a constraint to load services without exceeding the use of more than a certain level (e.g., 80%) of the client's computational resources (e.g., CPU utilization). The agent can set a constraint to load services without exceeding the use of a certain number of kiloBytes in total, or over a defined time window. A user can specify constraint(s) to use, to supplement or override constraint(s) determined by the agent. In some embodiments, the agent can override certain user-specified constraints, e.g., in order to ensure acceptable operation.

The agent can use (or take into account) specified constraints such as the bandwidth score/value, available client device resources, service metadata/definitions from the configuration (e.g., requests information, expected bandwidth utilization, loading speed and/or time), and/or usage information about the service (e.g., how quickly user interactivity should be reached, temporal pattern of use, loading progression, priority), to manage and sequence the service requests (e.g., to the browser for loading). The agent can determine the state of loading of the underlying application (e.g., if the page is being painted, completely painted, or is interactive, for example by listening to browser or DOM events), to manage and sequence the service requests. The agent can control the service requests sent via the browser or application, for loading of one or more services. Hence, the agent can improve on application level congestion control for loading of services. For example, the agent can manage the loading of the services using a bestfit approach. The following includes an example embodiment of the bestfit function for managing and ordering the service requests:

```
function listenForApplicationEvents( ){ //Capture Loading Events
// - Rapid Execution
// - First visual elements
// - loading event
// - fully painted
// - fully interactive
// - Service Finished Loading
}
function bestFit(budgetValue, budgetType){
//Sort services descending order of priority. Highest priority first.
    serviceArray.sort(-1);
    //Capture the current time
    var currentTime = new Date( );
    //capture percent finished loading
    //get next available service
    nextService = serviceArray.first( );
    while (nextService != null){
        //See if the service is over budget.
        if (budget(budgetValue, budgetType) >
            nextService.budget(budgetType)){
                loadService(nextService);
                //Remove the first service.
                services.remove(0);
        }else{
            //Get next service.
            nextService = serviceArray.next( );
        }
    }
    //Wait for next loading Event.
}
function budget(budgetValue, budgetType){
    if (budgetType == 'time'){
        var timeSpendLoadingApplication = (currentTime - startTime);
        return budgetValue - timeSpendLoadingApplication;
    }else if (budgetType == 'bandwidth'){
        return budgetValue - currentBandwith;
    }
}
```

In some embodiments, the bestfit function can track the progress of the application loading (e.g., application display and interactivity), to choose the next service(s) to load based on their loading characteristics. For instance, the bestfit function may initially prioritize the services according to their assigned or designated priority (e.g., from the configuration) and/or additional factors (e.g., request characteristics, server response times, usage characteristics, and so on). For example, the agent can adjust the priority of a service based on user interactivity with the service, and/or loading progression of the service. The function can determine whether to select the services also according to a time and/or bandwidth budget (or constraint). The function can determine if the expected bandwidth utilization or loading time of the highest priority service is within (time and/or bandwidth) budget available to the client. The agent can initiate loading of the service if within the budget, and may skip the loading of the service if not with the budget, in order to consider the next highest priority service for loading next. In some embodiments, the agent can continually or dynamically monitor the available bandwidth, e.g., in view of bandwidth utilization by other service(s) and/or resource(s), and can determine if a next service can be loaded (e.g., in parallel with one or more services and/or resources) at particular instances of time. For instance, the agent can determine that a bandwidth budget for loading is insufficient for loading a first priority service, and may proceed with loading second and third priority services concurrently because the bandwidth budget is sufficient for these. The agent can load the first priority service when the bandwidth budget becomes insufficient (e.g., at a next loading event). For instance, the next loading event can be triggered by a user action, such as user scrolling to a certain section of a webpage.

In some embodiments, instead of the bestfit function (or embodiments of the bestfit function which considers various combination of factors), the agent and/or the intermediary can be configured to use another function, such as highest-priority function. The latter function may cause the agent to load the services according to their priority (as defined or set in the configuration).

Figure 4C:
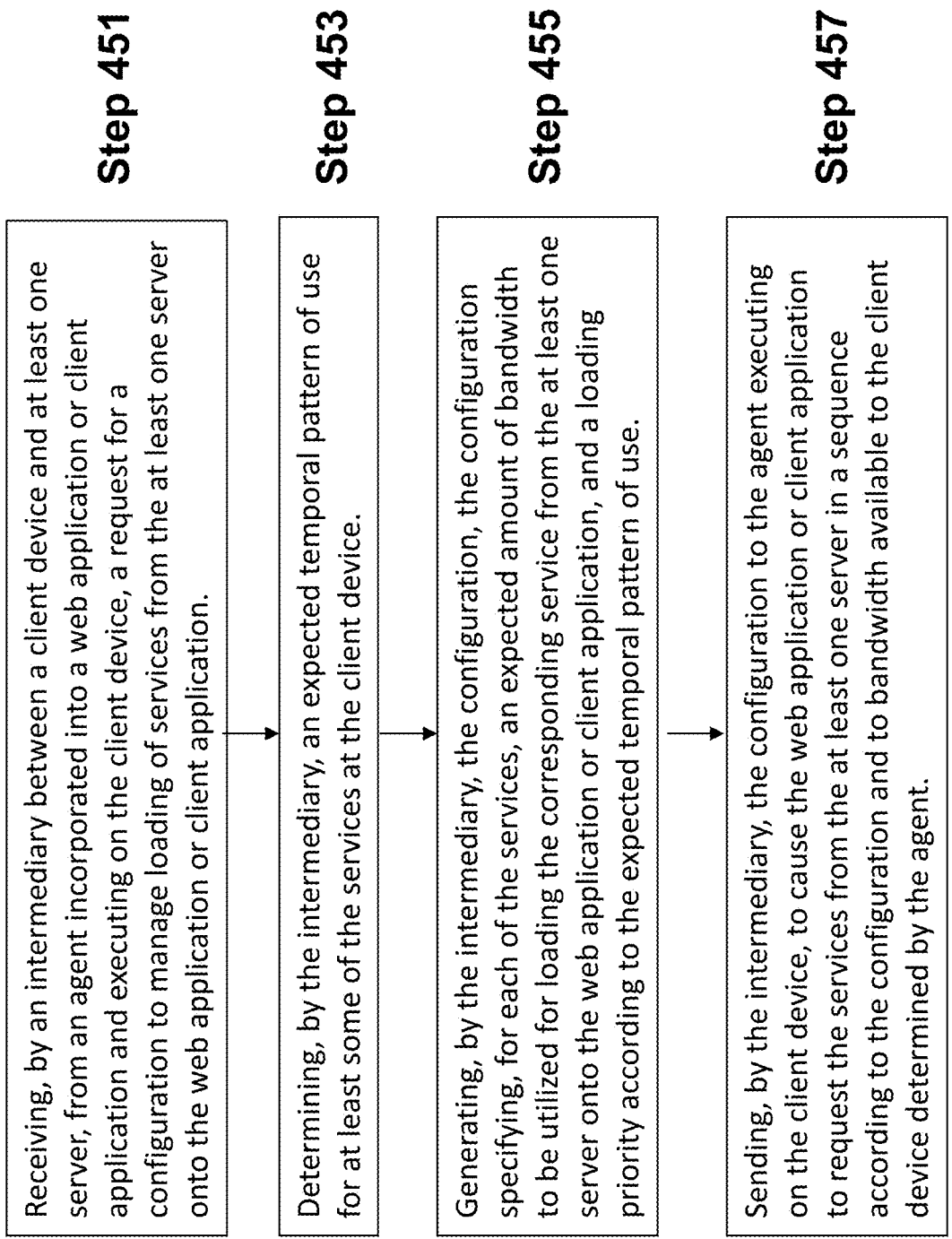
FIG. 4C depicts one embodiment of a method for managing client-side services.

Referring now to FIG. 4C, one embodiment of a method for managing client-side services is depicted. The method may include receiving, by an intermediary between a client device and at least one server, from an agent incorporated into a web application or client application and executing on the client device, a request for a configuration to manage loading of services from the at least one server onto the web application or client application (451). The intermediary can determine an expected temporal pattern of use for at least some of the services at the client device (453). The intermediary may generate the configuration (455). The configuration can specify, for each of the services, an expected amount of bandwidth to be utilized for loading the corresponding service from the at least one server onto the web application or client application, and a loading priority according to the expected temporal pattern of use. The intermediary can send the configuration to the agent executing on the client device, to cause the web application or client application to request the services from the at least one server in a sequence according to the configuration and to bandwidth available to the client device as determined by the agent (457).

It should be noted that certain passages of this disclosure may reference terms such as "first" and "second" in connection with clients, requests, etc., for purposes of identifying or differentiating one from another or from others. These terms are not intended to merely relate entities (e.g., a first request and a second request) temporally or according to a sequence, although in some cases, these entities may include such a relationship. Nor do these terms limit the number of possible entities (e.g., clients) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method comprising:
    receiving, by an intermediary between a client device and at least one server, from an agent incorporated into a web application or client application and executing on the client device, a request for a configuration to manage loading of services from the at least one server onto the web application or client application;
    determining, by the intermediary, an expected temporal pattern of use for at least some of the services at the client device;
    generating, by the intermediary, the configuration, the configuration specifying, an expected amount of bandwidth to be utilized for loading each of the services from the at least one server onto the web application or client application, and loading priorities according to the expected temporal pattern of use; and
    sending, by the intermediary, the configuration to the agent executing on the client device, to cause the web application or client application to request the services from the at least one server in a sequence according to the configuration and to bandwidth available to the client device determined by the agent.

2. The method of claim 1, comprising determining, by the intermediary for a first service of the services, according to historical data, at least one of: a number of requests expected from the web application or client application to the at least one server to load the first service, an expected response time of the at least one server to a request from the web application or client application to load the first service, an expected speed for loading the first service from the at least one server to the web application or client application, or an expected loading progression pattern for the first service.

3. The method of claim 2, comprising generating, by the intermediary, the configuration, the configuration specifying for the first service at least one of:
    the number of requests expected from the web application or client application to the at least one server to load the first service, the expected response time of the at least one server to a request from the web application or client application to load the first service, the expected speed for loading the first service from the at least one server to the web application or client application, or the expected loading progression pattern for the first service.

4. The method of claim 1, comprising causing the web application or client application to request the services in a sequence according to hardware resources available on the client device, to the configuration, and to the bandwidth available to the client device determined by the agent.

5. The method of claim 1, comprising generating a loading priority for a first service of the services, according to at least one of: a number of requests expected from the web application or client application to the at least one server to load the first service, an expected response time of the at least one server to a request from the web application or client application to load the first service, an expected speed for loading the first service from the at least one server to the web application or client-side application, an expected loading progression pattern for the first service, a user interface location of the first service on the web application or client application, an expected temporal pattern of use of the first service, or an expected amount of bandwidth to be utilized for loading the first service from the at least one server onto the web application or client application.

6. The method of claim 1, wherein the configuration further specifies to load the services onto the web application or client application according to a sequence established by weighting the loading priorities of the services with corresponding amounts of bandwidth expected to be utilized for loading corresponding ones of the services.

7. The method of claim 1, comprising generating the configuration automatically or via user input, wherein the configuration further specifies to load the services onto the web application or client application according to the loading priorities of the services.

8. The method of claim 1, comprising prioritizing the loading of the services within a specified time constraint or a specified bandwidth.

9. The method of claim 1, further comprising tracking user interaction with a first service of the services, wherein the configuration specifies a loading priority for the first service according to the user interaction.

10. The method of claim 1, comprising:
  receiving or monitoring, by the intermediary, runtime characteristics of the services; and
  maintaining, by the intermediary, the received runtime characteristics in a storage device.

11. A system comprising:
  one or more processors for implementing an intermediary between a client device and at least one server, the intermediary configured to:
  receive from an agent incorporated into a web application or client application and executing on the client device, a request for a configuration to manage loading of services from the at least one server onto the web application or client application;
  determine an expected temporal pattern of use for at least some of the services at the client device;
  generate the configuration, the configuration specifying an expected amount of bandwidth to be utilized for loading each of the services from the at least one server onto the web application or client application, and loading priorities according to the expected temporal pattern of use; and
  send the configuration to the agent executing on the client device, to cause the web application or client application to request the services from the at least one server in a sequence according to the configuration and to bandwidth available to the client device determined by the agent.

12. The system of claim 11, wherein the intermediary is configured to determine, for a first service of the services, according to historical data, at least one of: a number of requests expected from the web application or client application to the at least one server to load the first service, an expected response time of the at least one server to a request from the web application or client application to load the first service, an expected speed for loading the first service from the at least one server to the web application or client application, or an expected loading progression pattern for the first service.

13. The system of claim 12, wherein the intermediary is configured to generate the configuration, the configuration specifying for the first service at least one of: the number of requests expected from the web application or client application to the at least one server to load the first service, the expected response time of the at least one server to a request from the web application or client application to load the first service, the expected speed for loading the first service from the at least one server to the web application or client application, or the expected loading progression pattern for the first service.

14. The system of claim 11, wherein the intermediary is configured to cause the web application or client application to request the services in a sequence according to hardware resources available on the client device, to the configuration, and to the bandwidth available to the client device determined by the agent.

15. The system of claim 11, wherein the intermediary is configured to generate a loading priority for a first service of the services, according to at least one of: a number of requests expected from the web application or client application to the at least one server to load the first service, an expected response time of the at least one server to a request from the web application or client application to load the first service, an expected speed for loading the first service from the at least one server to the web application or client application, an expected loading progression pattern for the first service, a user interface location of the first service on the web application or client application, an expected temporal pattern of use of the first service, or an expected amount of bandwidth to be utilized for loading the first service from the at least one server onto the web application or client application.

16. The system of claim 11, wherein the configuration further specifies to load the services onto the web application or client application according to a sequence established by weighting the loading priorities of the services with corresponding amounts of bandwidth expected to be utilized for loading corresponding ones of the services.

17. The system of claim 11, wherein the intermediary is configured to generate the configuration automatically or via user input, wherein the configuration further specifies to load the services onto the web application or client application according to the loading priorities of the services.

18. The system of claim 11, comprising prioritizing the loading of the services within a specified time constraint or a specified bandwidth.

19. The system of claim 11, further comprising a metadata engine configured to track user interaction with a first service of the services, wherein the configuration specifies a loading priority for the first service according to the user interaction.

20. The system of claim 11, further comprising a metadata engine of the intermediary, configured to:
  receive or monitor runtime characteristics of the services; and
  maintain the received runtime characteristics in a storage device.

* * * * *